US012802275B2

(12) United States Patent
Lee et al.

(10) Patent No.: US 12,802,275 B2
(45) Date of Patent: Nov. 17, 2026

(54) ELECTRONIC DEVICE PERFORMING CAMERA CALIBRATION, AND OPERATION METHOD THEREFOR

(71) Applicant: Samsung Electronics Co., Ltd., Suwon-si (KR)

(72) Inventors: Sanghoon Lee, Suwon-si (KR); Hongpyo Lee, Suwon-si (KR); Sunggwan Park, Suwon-si (KR); Chanwon Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 19/071,152

(22) Filed: Mar. 5, 2025

(65) Prior Publication Data

US 2025/0238956 A1 Jul. 24, 2025

Related U.S. Application Data

(63) Continuation of application No. PCT/KR2023/011608, filed on Aug. 7, 2023.

(30) Foreign Application Priority Data

Sep. 8, 2022 (KR) ........................ 10-2022-0114495
Nov. 24, 2022 (KR) ........................ 10-2022-0159491

(51) Int. Cl.
*G06T 7/80* (2017.01)
*G06T 7/55* (2017.01)

(52) U.S. Cl.
CPC .................. *G06T 7/80* (2017.01); *G06T 7/55* (2017.01); *G06T 2207/30008* (2013.01); *G06T 2207/30196* (2013.01); *G06T 2207/30244* (2013.01)

(58) Field of Classification Search
CPC ............. G06T 7/55; G06T 2207/30008; G06T 2207/30196; G06T 2207/30244
See application file for complete search history.

(56) References Cited

U.S. PATENT DOCUMENTS 9,965,870 B2 * 5/2018 Claveau ............... H04N 17/002
10,083,513 B2 9/2018 Tsubota et al.
(Continued)

FOREIGN PATENT DOCUMENTS

JP 2015-226209 A 12/2015
JP 2019-158414 A 9/2019
(Continued)

OTHER PUBLICATIONS

Takahashi et al.; Human Pose as Calibration Pattern; 3D Human Pose Estimation with Multiple Unsynchronized and Uncalibrated Cameras; Computer Vision Foundation (CVF); Jun. 1, 2018.
(Continued)

*Primary Examiner* — Jae N Noh
(74) *Attorney, Agent, or Firm* — Jefferson IP Law, LLP

(57) ABSTRACT

An electronic device for performing calibration is provided. The electronic device includes a communication interface, memory storing one or more computer programs, and one or more processors communicatively coupled to the communication interface and the memory, wherein the one or more computer programs include computer-executable instructions that, when executed by the one or more processors individually or collectively, cause the electronic device to obtain, via the communication interface, a first image of a user captured by a first camera, and a second image of the user captured by a second camera, extract first joint feature points, which are two-dimensional (2D) position coordinate values of joints of the user, from the first image, and second joint feature points, which are 2D position coordinate values of the joints, from the second image, obtain three-dimen-
(Continued)

sional (3D) joint feature points of the joints by lifting the extracted first joint feature points to 3D position coordinate values, obtain a projection relationship for projecting the 3D joint feature points onto the 2D position coordinate values of the second joint feature points, and perform camera calibration by predicting a positional relationship between the first camera and the second camera based on the obtained projection relationship.

19 Claims, 16 Drawing Sheets

(56) References Cited

U.S. PATENT DOCUMENTS

| | | | | |
|---|---|---|---|---|
| 10,825,197 | B2 * | 11/2020 | Hall | G06T 17/00 |
| 10,896,521 | B2 | 1/2021 | Yasunaga et al. | |
| 10,997,747 | B2 | 5/2021 | Lee et al. | |
| 11,095,870 | B1 | 8/2021 | Tahara et al. | |
| 2021/0004933 | A1 * | 1/2021 | Wong | G06T 3/4038 |
| 2021/0104069 | A1 | 4/2021 | Tahara et al. | |
| 2022/0189113 | A1 * | 6/2022 | Seo | G06T 7/55 |

FOREIGN PATENT DOCUMENTS

| | | | |
|---|---|---|---|
| KR | 10-2015-0125429 | A | 11/2015 |
| KR | 10-2018-0103280 | A | 9/2018 |
| KR | 10-2020-0064947 | A | 6/2020 |
| KR | 10-2022-0077731 | A | 6/2022 |
| KR | 10-2022-0104025 | A | 7/2022 |
| KR | 10-2421067 | B1 | 7/2022 |

OTHER PUBLICATIONS

International Search Report with Written Opinion and English translation dated Nov. 1, 2023; International Appln. No. PCT/KR2023/011608.

* cited by examiner

<IN A CASE THAT CAMERA CALIBRATION IS ACCURATELY PERFORMED>

<IN A CASE THAT RE-CALIBRATION IS REQUIRED>

ELECTRONIC DEVICE PERFORMING CAMERA CALIBRATION, AND OPERATION METHOD THEREFOR

CROSS-REFERENCE TO RELATED APPLICATION(S)

This application is a continuation application, claiming priority under 35 U.S.C. § 365(c), of an International application No. PCT/KR2023/011608, filed on Aug. 7, 2023, which is based on and claims the benefit of a Korean patent application number 10-2022-0114495, filed on Sep. 8, 2022, in the Korean Intellectual Property Office, and of a Korean patent application number 10-2022-0159491, filed on Nov. 24, 2022, in the Korean Intellectual Property Office, the disclosure of each of which is incorporated by reference herein in its entirety.

BACKGROUND

1. Field

The disclosure relates to an electronic device for performing camera calibration of a plurality of cameras and an operation method thereof. More particularly, the disclosure relates to an electronic device for obtaining information about a positional relationship between cameras based on two-dimensional (2D) feature points extracted from the cameras.

2. Description of Related Art

Triangulation is used to obtain a distance from a camera to an object, i.e., a depth value, by using a plurality of cameras. In order to obtain an accurate depth value of the object by using triangulation, it is necessary to know in advance a positional relationship between the plurality of cameras, i.e., information about the relative positions and orientations between the plurality of cameras. In particular, when a camera is not fixed at a certain location, for example, in the case of a camera in a smartphone, a home closed-circuit television (CCTV), or a robot vacuum cleaner, a position and a view of the camera may be changed due to movement thereof. To accurately predict a changed positional relationship between the plurality of cameras, camera calibration needs to be performed again.

In general, various proposed methods for performing camera calibration for estimating a positional relationship between a plurality of cameras may include structure-from-motion (SfM), stereo vision, visual localization, a method using a checkerboard, etc.

Among the existing methods, SfM is a method involving extracting two-dimensional (2D) feature points from a plurality of images captured at different angles by using a plurality of cameras, and estimating a positional relationship between the cameras by matching corresponding 2D feature points between the plurality of images among the extracted 2D feature points. Because SfM is applied only to pairs of 2D feature points on the same plane, this method has a limitation in that it is not applied to other planes. Among the other methods, the method using a checkerboard involves obtaining a plurality of images of a checkerboard captured by using a plurality of cameras and predicting a positional relationship between the cameras by matching grid points on the checkerboard in the obtained plurality of images. The method using a checkerboard has a prerequisite that all grid points on the checkerboard be on the same plane, which is cumbersome because the method requires the checkerboard, and when a position of a camera changes, the checkerboard is required to be prepared again.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for obtaining information about a positional relationship between cameras based on two-dimensional (2D) feature points extracted from the cameras.

Additional aspects will be set forth in part in the description which follows and, in part, will be apparent from the description, or may be learned by practice of the presented embodiments.

In accordance with an aspect of the disclosure, an electronic device for performing camera calibration is provided. The electronic device includes a communication interface, memory storing one or more computer programs, and one or more processors including processing circuitry and communicatively coupled to the communication interface and the memory, wherein the one or more computer programs include computer-executable instructions that, when executed by the one or more processors individually or collectively, cause the electronic device to obtain, via the communication interface, a first image of a user captured by a first camera and a second image of the user captured by a second camera, extract first joint feature points, which are two-dimensional (2D) position coordinate values of joints of the user, from the first image, and second joint feature points, which are 2D position coordinate values of the joints, from the second image, obtain three-dimensional (3D) joint feature points of the joints by lifting the extracted first joint feature points to 3D position coordinate values, obtain a projection relationship for projecting the 3D joint feature points onto the 2D position coordinate values of the second joint feature points, and perform camera calibration by predicting a positional relationship between the first camera and the second camera based on the obtained projection relationship.

In accordance with another aspect of the disclosure, a method performed by an electronic device for performing camera calibration is provided. The method includes obtaining, by the electronic device, a first image of a user captured from a first camera, and a second image of the user captured from a second camera, extracting, by the electronic device, first joint feature points, which are 2D position coordinate values of joints of the user, from the first image, and second joint feature points, which are 2D position coordinate values of the joints, from the second image, obtaining, by the electronic device, 3D joint feature points of the joints by lifting the extracted first joint feature points to 3D position coordinate values, obtaining, by the electronic device, a projection relationship for projecting the 3D joint feature points onto the 2D position coordinate values of the second joint feature points, and performing, by the electronic device, camera calibration by predicting a positional relationship between the first camera and the second camera based on the obtained projection relationship.

In accordance with another aspect of the disclosure, one or more non-transitory computer-readable storage media storing one or more computer programs including computer-executable instructions that, when executed by one or more processors of an electronic device individually or collectively, cause the electronic device to perform operations, are provided. The operations include obtaining, by the electronic device, a first image of a user captured by a first camera and a second image of the user captured by a second camera, extracting, by the electronic device, first joint feature points, which are 2D position coordinate values of joints of the user, from the first image, and second joint feature points, which are 2D position coordinate values of the joints, from the second image, obtaining, by the electronic device, 3D joint feature points of the joints by lifting the extracted first joint feature points to 3D position coordinate values, obtaining, by the electronic device, a projection relationship for projecting the 3D joint feature points onto the 2D position coordinate values of the second joint feature points, and performing, by the electronic device, camera calibration by predicting a positional relationship between the first camera and the second camera based on the obtained projection relationship.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
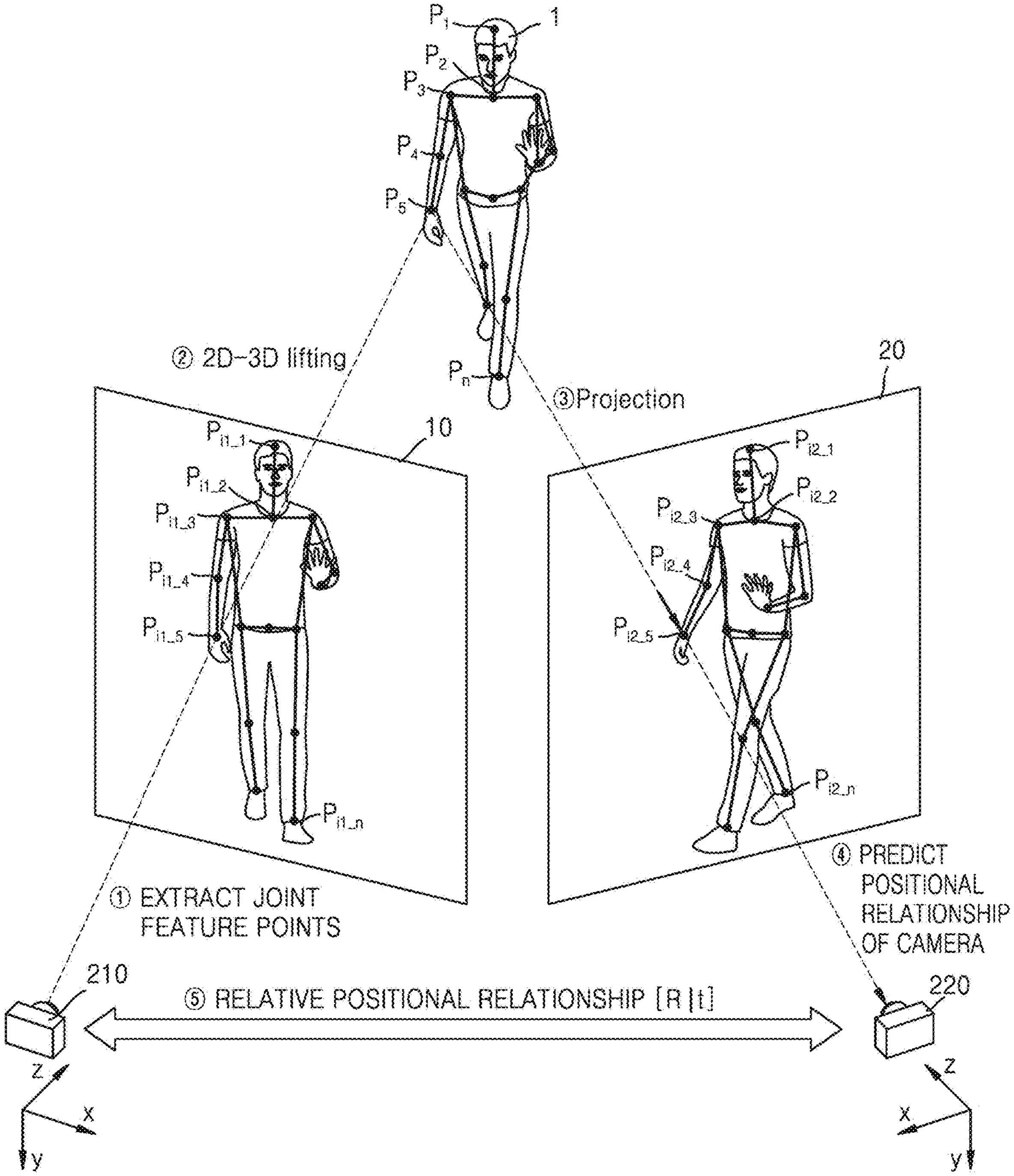
FIG. 1A is a conceptual diagram illustrating operations whereby an electronic device performs camera calibration according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Throughout the disclosure, when a part “includes” or “comprises” an element, unless there is a particular description contrary thereto, it is understood that the part may further include other elements, not excluding the other elements. Furthermore, terms, such as “portion,” “module,”

etc., used herein indicate a unit for processing at least one function or operation, and may be implemented as hardware or software or a combination of hardware and software.

The expression "configured to (or set to)" used herein may be used interchangeably, according to context, with, for example, the expression "suitable for," "having the capacity to," "designed to," "adapted to," "made to," or "capable of". The term "configured to (or set to)" may not necessarily mean only "specifically designed to" in terms of hardware. Instead, the expression "a system configured to" may mean, in some contexts, the system being "capable of", together with other devices or components. For example, the expression "a processor configured to (or set to) perform A, B, and C" may mean a dedicated processor (e.g., an embedded processor) for performing the corresponding operations, or a general-purpose processor (e.g., a central processing unit (CPU) or an application processor (AP)) capable of performing the corresponding operations by executing one or more software programs stored in memory.

Furthermore, in the disclosure, when a component is referred to as being "connected" or "coupled" to another component, it should be understood that the component may be directly connected or coupled to the other component, but may also be connected or coupled to the other component via another intervening component therebetween unless there is a particular description contrary thereto.

As used herein, 'camera calibration' refers to an operation of estimating or obtaining a positional relationship between a plurality of cameras. The positional relationship between the cameras may include information about positions and orientations of the plurality of cameras arranged at different locations. In an embodiment of the disclosure, the camera calibration may include an operation of obtaining a rotation matrix, denoted by R, and a translation vector, denoted by t. The camera calibration may also be referred to as 'pose estimation between cameras'.

As used in the disclosure, a 'joint' is a part of a human body where bones are connected to each other, such as one or more regions included in the head, neck, arm, shoulder, waist, knee, leg, or foot.

As used herein, 'joint feature points' represent position coordinate values for a plurality of joints included in a body.

As used herein, a 'three-dimensional (3D) pose' of a user refers to a pose consisting of 3D position coordinate values of 3D feature points of joints of the user. In a 3D pose, a 'pose' has a different meaning than a pose between cameras, which is another expression for camera calibration.

In the disclosure, functions related to artificial intelligence (AI) are performed via a processor and memory. The processor may be configured as one or a plurality of processors. In this case, the one or plurality of processors may be a general-purpose processor such as a CPU, an AP, a digital signal processor (DSP), etc., a dedicated graphics processor such as a graphics processing unit (GPU) and a vision processing unit (VPU), or a dedicated AI processor such as a neural processing unit (NPU). The one or plurality of processors control input data to be processed according to predefined operation rules or AI model stored in the memory. Alternatively, in a case that the one or plurality of processors are a dedicated AI processor, the dedicated AI processor may be designed with a hardware structure specialized for processing a particular AI model.

The predefined operation rules or AI model are created via a training process. In this case, the creation via the training process means that the predefined operation rules or AI model set to perform desired characteristics (or purposes) are created by training a basic AI model based on a large number of training data via a learning algorithm. The training process may be performed by an apparatus itself on which AI according to the disclosure is performed, or via a separate server and/or system. Examples of a learning algorithm may include, but are not limited to, supervised learning, unsupervised learning, semi-supervised learning, and reinforcement learning.

In the disclosure, an 'AI model' may consist of a plurality of neural network layers. Each of the plurality of neural network layers has a plurality of weight values and may perform neural network computations via calculations between a result of computations in a previous layer and the plurality of weight values. A plurality of weight values assigned to each of the plurality of neural network layers may be optimized by a result of training the AI model. For example, the plurality of weight values may be updated to reduce or minimize a loss or cost value obtained in the AI model during a training process. An artificial neural network model may include a deep neural network (DNN), such as a convolutional neural network (CNN), a recurrent neural network (RNN), a restricted Boltzmann machine (RBM), a deep belief network (DBN), a bidirectional recurrent DNN (BRDNN), or a deep Q-network (DQN), but is not limited thereto.

An embodiment of the disclosure will be described more fully hereinafter with reference to the accompanying drawings so that the embodiment may be easily implemented by a person of ordinary skill in the art. However, the disclosure may be implemented in different forms and should not be construed as being limited to embodiments set forth herein.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

Hereinafter, embodiments of the disclosure are described in detail with reference to the accompanying drawings.

FIG. 1A is a conceptual diagram illustrating operations whereby an electronic device performs camera calibration according to an embodiment of the disclosure.

Referring to FIG. 1A, a first camera 210 may obtain a first image 10 by capturing an image of a user 1 and a second camera 220 may obtain a second image 20 by capturing an image of the user 1. The first camera 210 and the second camera 220 may be positioned at different locations and may be positioned to face an object ('the user 1' in the embodiment illustrated in FIG. 1A) in different directions. The first image 10 captured by the first camera 210 and the second image 20 captured by the second camera 220 may be two-dimensional (2D) images. An electronic device (100 of FIG. 2) may obtain the first image 10 from the first camera 210 and the second image 20 from the second camera 220. In an embodiment of the disclosure, the electronic device 100 may be connected to the first camera 210 and the second camera 220 via a wired or wireless communication network, and receive the first image 10 and the second image 20 via the wired or wireless communication network.

The electronic device 100 extracts joint feature points from each of the first image 10 and the second image 20 (operation ①). In an embodiment of the disclosure, the electronic device 100 may extract first joint feature points $P_{i1\_1}$, $P_{i1\_2}$, . . . , and $P_{i1\_n}$ from the first image 10 and second joint feature points $P_{i2\_1}$, $P_{i2\_2}$, . . . , and $P_{i2\_n}$ from the second image 20. The first joint feature points $P_{i1\_1}$, $P_{i1\_2}$, . . . , and $P_{i1\_n}$ and the second joint feature points $P_{i2\_1}$, $P_{i2\_2}$, . . . , and $P_{i2\_n}$ may include a plurality of 2D position coordinate values for a plurality of joints included in a body of the user 1, e.g., one or more regions included in the head, neck, arms, shoulders, waist, knees, legs, or feet. In an embodiment of the disclosure, the electronic device 100 may obtain the first joint feature points $P_{i1\_1}$, $P_{i1\_2}$, . . . , and $P_{i1\_n}$ from the first image 10 and the second joint feature points $P_{i2\_1}$, $P_{i2\_2}$, . . . , and $P_{i2\_n}$ from the second image 20 by using an AI model trained to extract 2D position coordinate values corresponding to joint feature points for human joints from a 2D image.

The electronic device 100 may obtain 3D joint feature points $P_1$, $P_2$, . . . , and $P_n$ by lifting the first joint feature points $P_{i1\_1}$, $P_{i1\_2}$, . . . , and $P_{i1\_n}$ extracted from the first image 10 to 3D position coordinate values (operation ②). In an embodiment of the disclosure, the electronic device 100 may obtain 3D joint feature points $P_1$, $P_2$, . . . , and $P_n$ from the first joint feature points $P_{i1\_1}$, $P_{i1\_2}$, . . . , and $P_{i1\_n}$, which are 2D position coordinate values, by using an AI model trained to obtain 3D joint feature points from joint feature points included in an red, green, and blue (RGB) image. For example, the fifth feature point $P_{i1\_5}$ among the first joint feature points $P_{i1\_1}$, $P_{i1\_2}$, . . . , and $P_{i1\_n}$ may be transformed into position coordinate values of the fifth 3D joint feature point P5 among the 3D position coordinate values via lifting.

The electronic device 100 may obtain a projection relationship for respectively matching the 3D joint feature points $P_1$, $P_2$, . . . , and $P_n$ with the second joint feature points $P_{i2\_1}$, $P_{i2\_2}$, . . . , and $P_{i2\_n}$ in the second image 20 (operation ③). In an embodiment of the disclosure, the electronic device 100 may obtain information about a projection relationship for projecting the 3D joint feature points $P_1$, $P_2$, . . . , and $P_n$ to match 2D position coordinate values of the second joint feature points $P_{i2\_1}$, $P_{i2\_2}$, . . . , and $P_{i2\_n}$. According to a result of projecting the 3D joint feature points $P_1$, $P_2$, . . . , and $P_n$, combinations of the 3D joint feature points $P_1$, $P_2$, . . . , $P_n$ and the second joint feature points $P_{i2\_1}$, $P_{i2\_2}$, . . . , and $P_{i2\_n}$ may have 2D-3D correspondences. In the embodiment illustrated in FIG. 1A, the fifth position coordinate values $P_5$ among the 3D joint feature points $P_1$, $P_2$, . . . , and $P_n$ may be projected onto the fifth feature point $P_{i2\_5}$ among the second joint feature points $P_{i2\_1}$, $P_{i2\_2}$, . . . , and $P_{i2\_n}$, and the fifth position coordinate values $P_5$ and the fifth feature point $P_{i2\_5}$ may have a 2D-3D correspondence. In an embodiment of the disclosure, the 'projection relationship' may include information about a rotation direction and a movement distance value for projecting 3D position coordinate values to 2D position coordinate values based on a 2D-3D correspondence.

The electronic device 100 predicts a positional relationship of the second camera 220 based on the projection relationship (operation ④). In an embodiment of the disclosure, the electronic device 100 may predict a position and an orientation of the second camera 220 based on the projection relationship between the 3D joint feature points $P_1$, $P_2$, . . . , and $P_n$ and the second joint feature points $P_{i2\_1}$, $P_{i2\_2}$, . . . , and $P_{i2\_n}$.

The electronic device 100 may obtain a relative positional relationship between the first camera 210 and the second camera 220 (operation ⑤). In an embodiment of the disclosure, the electronic device 100 may obtain information about the relative position and orientation of the second camera 220 with respect to a position and an orientation of the first camera 210 as a pose between the cameras. For example, the electronic device 100 may estimate a relative positional relationship between the cameras by using a Perspective-n-Point (PnP) method. In an embodiment of the disclosure, the electronic device 100 may obtain information about a relative positional relationship between the cameras, including a rotation matrix R and a translation vector t.

The electronic device 100 may perform camera calibration by using the relative positional relationship between the cameras. A specific method, performed by the electronic device 100, of performing camera calibration by using the first image 10 obtained from the first camera 210 and the second image 20 obtained from the second camera 220 is described with reference to FIG. 1B.

Figure 1B:
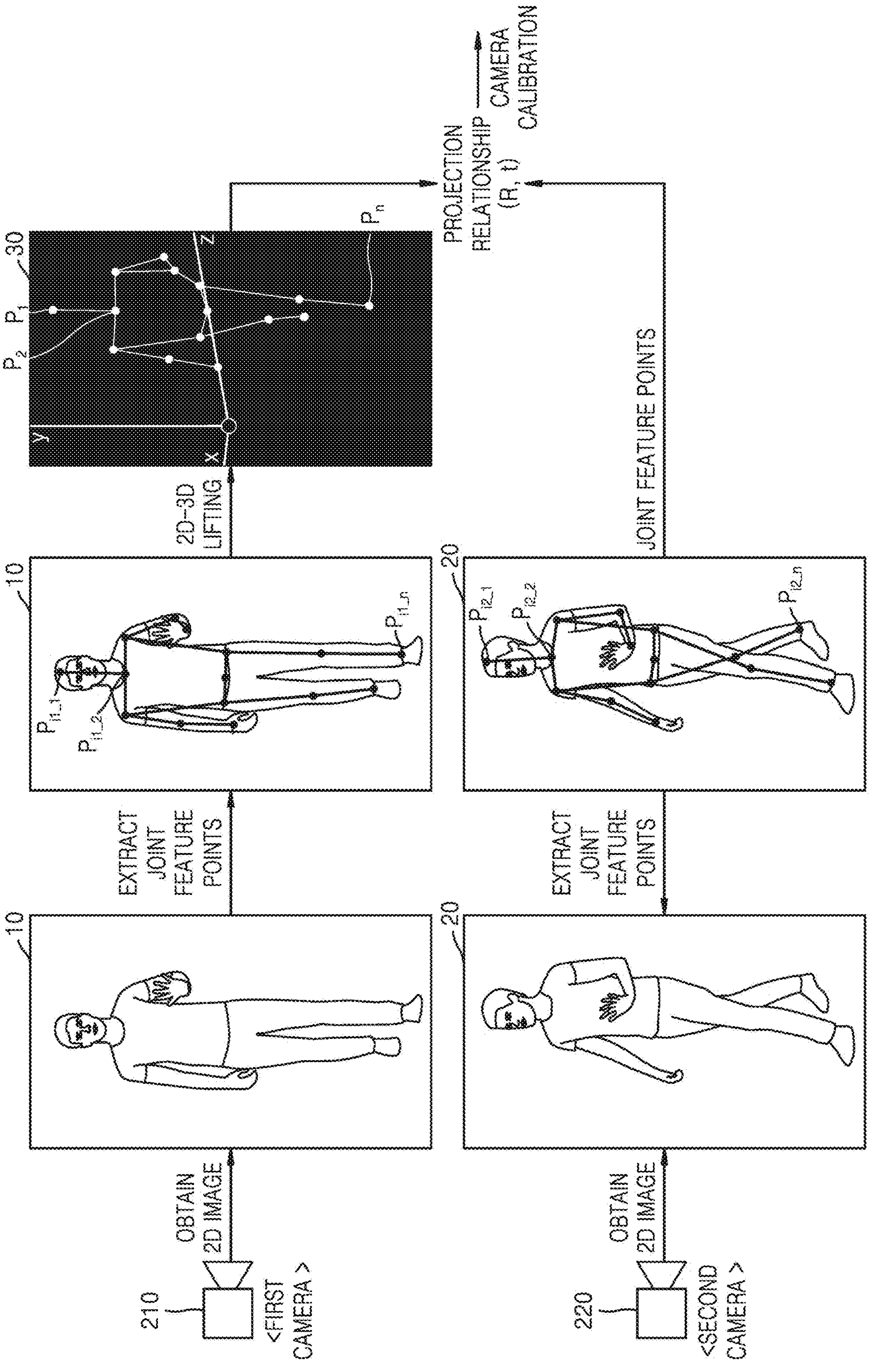
FIG. 1B is a diagram illustrating operations whereby an electronic device performs camera calibration according to an embodiment of the disclosure.

FIG. 1B is a diagram illustrating operations whereby an electronic device performs camera calibration according to an embodiment of the disclosure.

Referring to FIG. 1B, the first camera 210 may obtain a first image 10, which is a 2D image, by capturing an image of the user, and the second camera 220 may obtain a second image 20, which is a 2D image, by capturing an image of the user. The electronic device (100 of FIG. 2) may obtain the first image 10 from the first camera 210 and the second image 20 from the second camera 220.

The electronic device 100 may extract joint feature points from each of the first image 10 and the second image 20. In the embodiment illustrated in FIG. 1B, the electronic device 100 may extract first joint feature points $P_{i1\_1}$, $P_{i1\_2}$, . . . , and $P_{i1\_n}$, which are feature points included in joints of the user, e.g., the head, neck, arms, shoulders, waist, knees, legs, or feet, from the first image 10, and extract second joint feature points $P_{i2\_1}$, $P_{i2\_2}$, . . . , and $P_{i2\_n}$, which are feature points related to the joints of the user, from the second image 20. The first joint feature points $P_{i1\_1}$, $P_{i1\_2}$, . . . , and $P_{i1\_n}$ and the second joint feature points $P_{i2\_1}$, $P_{i2\_2}$, . . . , and $P_{i2\_n}$ may include a plurality of 2D position coordinate values for the joints of the user. The electronic device 100 may obtain a 2D pose of the user based on the first joint feature points $P_{i1\_1}$, $P_{i1\_2}$, . . . , and $P_{i1\_n}$ of the joints. Similarly, the electronic device 100 may obtain a 2D pose of the user based on the second joint feature points $P_{i2\_1}$, $P_{i2\_2}$, . . . , and $P_{i2\_n}$ of the joints.

The electronic device 100 may obtain 3D joint feature points $P_1$, $P_2$, . . . , and $P_n$ by performing 2D-3D lifting of the first joint feature points $P_{i1\_1}$, $P_{i1\_2}$, . . . , and $P_{i1\_n}$. By performing 2D-3D lifting, the electronic device 100 may transform the first joint feature points $P_{i1\_1}$, $P_{i1\_2}$, . . . , and $P_{i1\_n}$ consisting of 2D position coordinate values into the 3D joint feature points $P_1$, $P_2$, . . . , and $P_n$, which are 3D position coordinate values. In the embodiment illustrated in FIG. 1B, the electronic device 100 may obtain a 3D image 30 including 3D joint feature points $P_1$, $P_2$, . . . , and $P_n$ through the 2D-3D lifting. The electronic device 100 may predict a 3D pose of the user based on the 3D joint feature points $P_1$, $P_2$, . . . , and $P_n$ included in the 3D image 30.

The electronic device 100 may obtain a projection relationship R, t for matching the 3D joint feature points $P_1$, $P_2$, . . . , and $P_n$ with the second joint feature points $P_{i2\_1}$, $P_{i2\_2}$, . . . , and $P_{i2\_n}$ extracted from the second image 20. In an embodiment of the disclosure, the electronic device 100 may obtain information about the projection relationship R, t for projecting the 3D joint feature points $P_1$, $P_2$, . . . , and $P_n$ to match the 2D position coordinate values of the second joint feature points $P_{i2\_1}$, $P_{i2\_2}$, . . . , and $P_{i2\_n}$. In an embodiment of the disclosure, the projection relationship R, t may include information about a relative positional relationship between the cameras, including a rotation matrix R and a translation vector t.

The electronic device 100 may predict a relative positional relationship between the first camera 210 and the second camera 220 based on the projection relationship R, t, and perform camera calibration by using the relative positional relationship therebetween.

Existing camera calibration methods that are commonly used include structure-from-motion (SfM), stereo vision, visual localization, or using a checkerboard. Among the existing methods, SfM is a method involving extracting 2D feature points from a plurality of images captured at different angles by using a plurality of cameras, and estimating a positional relationship between the cameras by matching corresponding 2D feature points between the plurality of images among the extracted 2D feature points. Because SfM is applied only to pairs of 2D feature points on the same plane, this method has a limitation in that it is not applied to other planes. Among the other methods, using a checkerboard is a method involving obtaining a plurality of images of a checkerboard captured by using a plurality of cameras and predicting a positional relationship between the cameras by matching grid points on the checkerboard in the obtained plurality of images. The method using a checkerboard has a prerequisite that all grid points on the checkerboard be on the same plane, which is cumbersome because the method requires the checkerboard, and when a position of a camera changes, the checkerboard is required to be prepared again. In addition, stereo vision or visual localization methods necessarily have prerequisites such as knowing 3D position coordinate values of a reference point in advance.

The disclosure aims to provide the electronic device 100 and a method for operating the same for performing camera calibration by predicting a positional relationship between cameras by using feature points related to joints of the user without having a prerequisite such as a prerequisite that 2D feature points exist on the same plane, or without a separate device such as a checkerboard.

According to the embodiments illustrated in FIGS. 1A and 1B, the electronic device 100 may obtain the first joint feature points $P_{i1\_1}$, $P_{i1\_2}$, . . . , and $P_{i1\_n}$ and the second joint feature points $P_{i2\_1}$, $P_{i2\_2}$, . . . , and $P_{i2\_n}$, which are 2D position coordinate values for the joints of the user, from the first image 10 and the second image 20 respectively obtained from the first camera 210 and the second camera 220, lift the first joint feature points $P_{i1\_1}$, $P_{i1\_2}$, . . . , and $P_{i1\_n}$ to the 3D joint feature points $P_1$, $P_2$, . . . , and $P_n$ that are 3D position coordinate values, obtain a projection relationship R, t for projecting the 3D joint feature points $P_1$, $P_2$, . . . , and $P_n$ obtained via the lifting onto the second joint feature points $P_{i2\_1}$, $P_{i2\_2}$, . . . , and $P_{i2\_n}$, and perform camera calibration by obtaining a relative positional relationship between the first camera 210 and the second camera 220 based on the projection relationship R, t. According to an embodiment of the disclosure, the electronic device 100 uses 2D feature points of user's joints for camera calibration, thereby providing a technical effect of improving the accuracy and speed of camera calibration without applying a prerequisite that the 2D feature points exist on the same plane and using unnecessary devices such as a checkerboard. Furthermore, in an embodiment of the disclosure, the electronic device 100 obtains the 3D joint feature points $P_1$, $P_2$, . . . , and $P_n$ by lifting the first joint feature points $P_{i1\_1}$, $P_{i1\_2}$, . . . , and $P_{i1\_n}$, so does not need to know the 3D position coordinate values of a reference point in advance.

According to an embodiment of the disclosure, the electronic device 100 performs camera calibration by using joint feature points extracted from an image of a user in an environment where a camera is not fixed and a position or view of the camera changes, for example, in the case of) a camera in a mobile device, a home closed-circuit television (CCTV), or a robot vacuum cleaner, thereby increasing usability in daily life.

According to an embodiment of the disclosure, the electronic device 100 may obtain a 3D pose of the user via triangulation based on the first image 10, the second image 20, and the relative positional relationship between the first camera 210 and the second camera 220 obtained by performing camera calibration.

Figure 2:
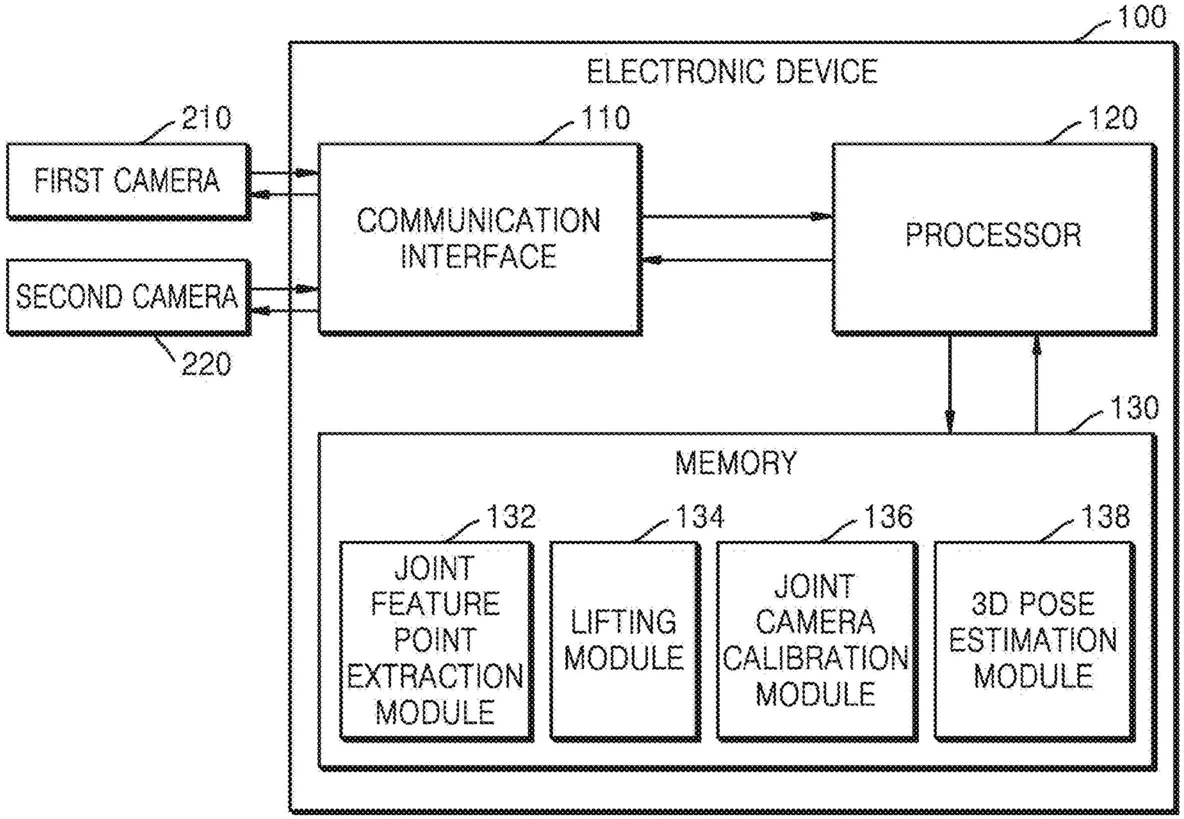
FIG. 2 is a block diagram illustrating components of an electronic device according to an embodiment of the disclosure.

FIG. 2 is a block diagram illustrating components of the electronic device 100 according to an embodiment of the disclosure.

The electronic device 100 may be a mobile device, such as a smartphone, a tablet personal computer (PC), a laptop computer, a digital camera, an e-book terminal, a digital broadcasting terminal, a personal digital assistant (PDA), a portable multimedia player (PMP), a navigation device, an MP3 player, or the like. In an embodiment of the disclosure, the electronic device 100 may be a home appliance such as a television (TV), an air conditioner, a robot vacuum cleaner, or a clothing manager. However, the disclosure is not limited thereto, and in another embodiment of the disclosure, the electronic device 100 may be implemented as a wearable device, such as a smartwatch, an eye glasses-shaped augmented reality (AR) device (e.g., AR glasses), a head-mounted display (HMD) apparatus, or a body-attached device (e.g., a skin pad).

Referring to FIG. 2, the electronic device 100 may include a communication interface 110, a processor 120, and memory 130. The communication interface 110, the processor 120, and the memory 130 may be electrically and/or physically connected to each other. FIG. 2 illustrates only essential components for describing operations of the electronic device 100, and the components included in the electronic device 100 are not limited to those shown in FIG. 2. In an embodiment of the disclosure, the electronic device 100 may further include a display that displays an image or a user interface (UI). In a case that the electronic device 100 is implemented as a mobile device, the electronic device 100 may further include a battery that supplies power to the communication interface 110 and the processor 120.

The first camera 210 and the second camera 220 are each configured to obtain an image of an object included in a real-world space (e.g., an indoor space) by capturing the image of the object. The first camera 210 and the second camera 220 may each include a lens module, an image sensor, and an image processing module. The first camera 210 and the second camera 220 may each obtain a still image or a video of an object through an image sensor (e.g., a complementary metal-oxide-semiconductor (CMOS) or charge-coupled device (CCD) sensor). An image processing module may encode a still image consisting of a single image frame or video data consisting of a plurality of image frames obtained through the image sensor, and transmit the encoded data to the processor 120.

In an embodiment of the disclosure, the first camera 210 may obtain a first image by capturing an image of a user, and the second camera 220 may obtain a second image by capturing an image of the user. The first camera 210 and the second camera 220 may be connected to the electronic device 100 via a wired or wireless communication network and transmit and receive data to and from the electronic device 100. In the embodiment illustrated in FIG. 2, the first camera 210 and the second camera 220 are illustrated as separate devices from the electronic device 100, but the disclosure is not limited thereto. In an embodiment of the disclosure, the first camera 210 may be included as a component of the electronic device 100, and the second camera 220 may be implemented as a device separate from the electronic device 100. In another embodiment of the disclosure, the first camera 210 and the second camera 220 may be both included as components of the electronic device 100.

The communication interface 110 is configured to perform data communication with an external device or server. In an embodiment of the disclosure, the communication interface 110 may be connected to the first camera 210 and the second camera 220 via a wired or wireless communication network, and receive the first image from the first camera 210 and the second image from the second camera 220. The communication interface 110 may receive the first image and the second image from the first camera 210 and the second camera 220, respectively, by using at least one of data communication methods including, for example, wired local area network (LAN), wireless LAN, Wi-Fi, Bluetooth, ZigBee, Wi-Fi Direct (WFD), Infrared Data Association (IrDA), Bluetooth Low Energy (BLE), near field communication (NFC), wireless broadband Internet (WiBro), World Interoperability for Microwave Access (WiMAX), Shared Wireless Access Protocol (SWAP), Wireless Gigabit Alliance (WiGig), and radio frequency (RF) communication. The communication interface 110 may provide image data of the received first image and second image to the processor 120.

The processor 120 may execute one or more instructions of a program stored in the memory 130. The processor 120 may be composed of hardware components that perform arithmetic, logic, and input/output (I/O) operations, and image processing. The processor 120 is shown as an element in FIG. 2, but is not limited thereto. In an embodiment of the disclosure, the processor 120 may be configured as one or a plurality of elements. The processor 120 may be a general-purpose processor such as a CPU, an AP, a DSP, etc., a dedicated graphics processor such as a GPU, a VPU, etc., or a dedicated AI processor such as an NPU. The processor 120 may control input data to be processed according to predefined operation rules or AI models stored in the memory 130. Alternatively, in a case that the processor 120 is a dedicated AI processor, the dedicated AI processor may be designed with a hardware structure specialized for processing a particular AI model.

The processor 120 according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing a variety of the recited/disclosed functions, e.g., in a distributed manner. At least one processor may execute program instructions to achieve or perform various functions.

The memory 130 may include at least one type of storage medium among, for example, flash memory-type memory, a hard disk-type memory, a multimedia card micro-type memory, card-type memory (e.g., a Secure Digital (SD) card or an eXtreme Digital (XD) memory), random access memory (RAM), static RAM (SRAM), read-only memory (ROM), electrically erasable programmable ROM (EEPROM), PROM, or an optical disc.

The memory 130 may store instructions related to operations of the electronic device 100 performing calibration. In an embodiment of the disclosure, the memory 130 may store at least one of instructions, algorithms, data structures, program code, and application programs readable by the processor 120. The instructions, algorithms, data structures, and program code stored in memory 130 may be implemented in programming or scripting languages such as C, C++, Java, assembler, etc.

The memory 130 may store instructions, algorithms, data structures, or program code related to a joint feature point extraction module 132, a lifting module 134, a camera calibration module 136, and a 3D pose estimation module 138. A 'module' included in the memory 130 refers to a unit for processing a function or an operation performed by the processor 120, and may be implemented as software such as instructions, algorithms, data structures, or program code.

Figure 3:
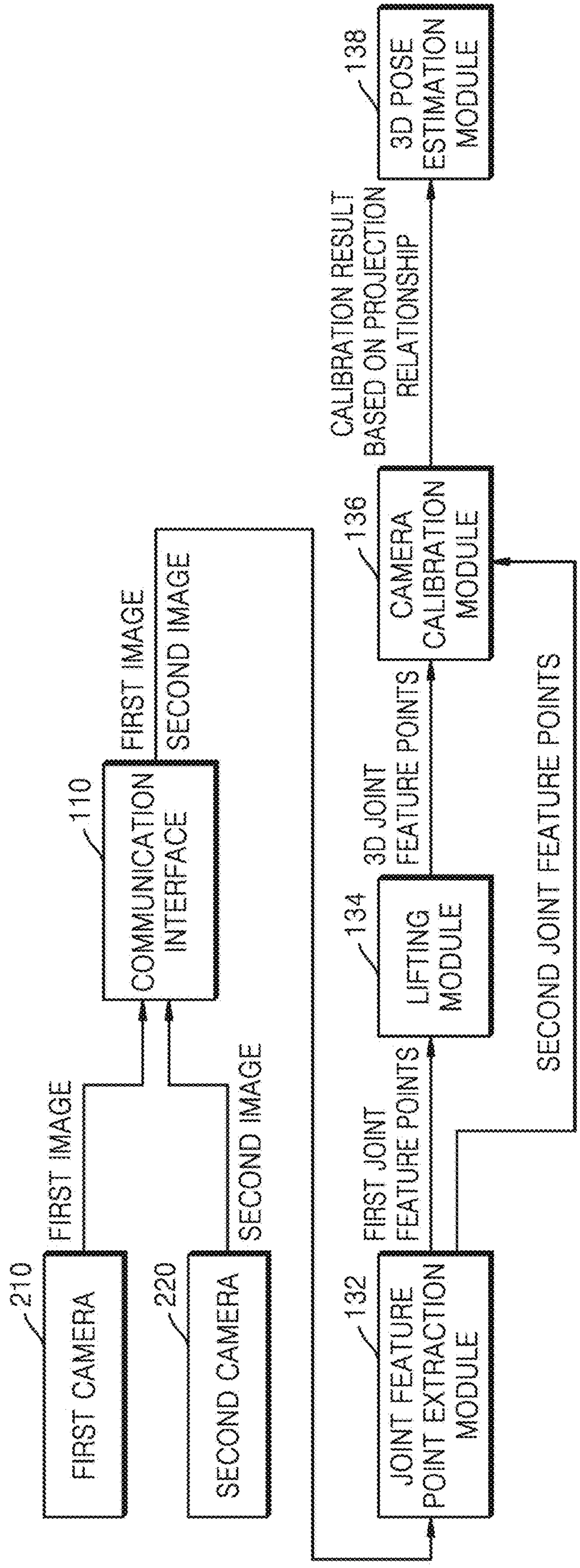
FIG. 3 is a diagram illustrating operations of components included in an electronic device and data transmitted and received between the components according to an embodiment of the disclosure.

FIG. 3 is a diagram illustrating operations of components included in the electronic device 100 and data transmitted and received between the components according to an embodiment of the disclosure.

Hereinafter, with reference to FIGS. 2 and 3 together, functions or operations that the processor 120 performs by executing instructions or program code included in modules stored in the memory 130 are described.

The joint feature point extraction module 132 is composed of instructions or program code related to a function and/or an operation of extracting feature points related to human joints from a 2D image. In an embodiment of the disclosure, the joint feature point extraction module 132 may include an AI model trained, via supervised learning, by applying a 2D image as input data and applying a plurality of 2D position coordinate values of human joints, e.g., one or more regions included in a head, a neck, arms, shoulders, waist, knees, legs, or feet, extracted from the 2D image, as output ground truth. For example, the AI model may be configured as a DNN, such as a CNN, an RNN, an RBM, a DBN, a BRDNN, or a DQN. In an embodiment of the disclosure, the joint feature point extraction module 132 may include a pose estimation model trained to extract 2D feature points of joints from a 2D RGB image and output a 2D pose by using the extracted 2D feature points. The pose estimation model may be configured as a DNN model, such as TensorFlow Lite or LitePose, but is not limited thereto.

The processor 120 may extract, from the first image, first joint feature points, which are 2D position coordinate values for joints, and extract, from the second image, second joint feature points, which are 2D position coordinate values for the joints, by executing the instructions or program code of the joint feature point extraction module 132. In an embodiment of the disclosure, the processor 120 may input the first image to the pose estimation model configured as a DNN model, and extract the first joint feature points from the first image via inference using the pose estimation model. Similarly, the processor 120 may input the second image to the pose estimation model, and extract the second joint feature points from the second image via inference using the pose estimation model. The processor 120 may obtain a 2D pose of the user from the first image based on the extracted first joint feature points. The processor 120 may obtain a 2D pose of the user from the second image based on the second joint feature points.

The joint feature point extraction module 132 may provide first joint feature data to the lifting module 134 and second joint feature data to the camera calibration module 136.

The lifting module 134 is composed of instructions or program code related to a function and/or an operation of obtaining 3D position coordinate values from 2D position coordinate values. In an embodiment of the disclosure, the lifting module 134 may include an AI model trained, via supervised learning, by applying 2D feature points obtained from an RGB image as input data and applying 3D position coordinate values corresponding to the 2D feature points as output ground truth. The AI model included in the lifting module 134 may be configured as, for example, a multi-stage CNN model, but is not limited thereto. For example, the lifting module 134 may also include a DNN model such as an RNN, an RBM, a DBN, a BRDNN, or a DQN.

The processor 120 may obtain 3D joint feature points, which are 3D position coordinate values by lifting first joint feature points, which are 2D position coordinate values, by executing the instructions or program code of the lifting module 134. In an embodiment of the disclosure, the processor 120 may input the first joint feature points to a DNN model included in the lifting module 134, and obtain 3D joint feature points that are 3D position coordinate values via inference using the DNN model. The processor 120 may obtain a lifting image representing a 3D pose of the user based on the 3D joint feature points.

In an embodiment of the disclosure, the processor 120 may determine whether a 3D pose of the user composed of the 3D joint feature points is suitable to apply to camera calibration, based on a distribution of position coordinate values in the z-axis direction among 3D position coordinate values included in the 3D joint feature points obtained through the lifting. In a case that the processor 120 determines that the pose of the user is not suitable to apply to camera calibration, the processor 120 may display, on the display, guide information requesting the user to assume a predetermined pose. A specific embodiment in which the processor 120 determines suitability for application to camera calibration based on z-axis coordinate values of 3D joint feature points is described in detail with reference to FIGS. 5 and 6.

The lifting module 134 may provide the 3D position coordinate values to the camera calibration module 136.

In an embodiment of the disclosure, the processor 120 may obtain a plurality of image frames captured over a certain period of time from the first camera 210, and obtain a plurality of 3D joint feature points by lifting, through the lifting module 134, a plurality of first joint feature points extracted from each of the plurality of image frames. The processor 120 may identify an image frame with a largest degree of distribution of position coordinate values in the z-axis direction among a plurality of 3D position coordinate values included in the plurality of 3D joint feature points, and provide information about the identified image frame to the camera calibration module 136. A specific embodiment in which the processor 120 identifies an image frame with a largest degree of distribution of z-axis coordinate values among 3D position coordinate values from a plurality of image frames, and performs camera calibration by using the identified image frame is described in detail with reference to FIGS. 7 and 8.

The camera calibration module 136 is composed of instructions or program code related to a function and/or an operation of obtaining a relative positional relationship between cameras based on a projection relationship. In an embodiment of the disclosure, the camera calibration module 136 may obtain information about a projection relationship regarding a projection rotation direction and a position movement for projecting 3D position coordinate values onto 2D position coordinate values. In an embodiment of the disclosure, a 'projection relationship R, t' may include information about a relative positional relationship between the cameras, including a rotation matrix R and a translation vector t.

The processor 120 may obtain a projection relationship R, t for projecting 3D joint feature points onto 2D positional coordinate values of second joint feature points by executing the instructions or program code of the camera calibration module 136. In an embodiment of the disclosure, the processor 120 may obtain information about a rotation direction and a movement distance value for projecting the 3D joint feature points to match the 2D position coordinate values of the second joint feature points. The processor 120 may perform camera calibration by predicting a relative positional relationship between the first camera 210 and the second camera 220 based on the projection relationship.

The camera calibration module 136 may provide information about the projection relationship R, t to the 3D pose estimation module 138.

The 3D pose estimation module 138 is composed of instructions or program code related to a function and/or an operation of estimating a 3D pose of the user by reflecting a result of camera calibration. In an embodiment of the disclosure, the 3D pose estimation module 138 may calculate 3D position coordinate values for feature points of the user's joints by using triangulation, and estimate a 3D pose of the user by using the calculated 3D position coordinate values.

The processor 120 may obtain 3D position coordinate values for feature points of the user's joints that reflect the result of camera calibration by executing the instructions or program code of the 3D pose estimation module 138. By using triangulation, the processor 120 may calculate 3D position coordinate values of the user's joints, based on the first joint feature points, the second joint feature points, and the relative positional relationship between the first camera 210 and the second camera 220 obtained by performing the camera calibration. The processor 120 may predict a 3D pose of the user based on the 3D position coordinate values.

In an embodiment of the disclosure, the processor 120 may obtain first position coordinate values and second position coordinate values by reprojecting the 3D position coordinate values onto 2D position coordinate values based on camera calibration information, and determine accuracy of the calibration based on the first position coordinate values and the second position coordinate values obtained as a result of the reprojection. In an embodiment of the disclosure, the processor 120 may measure bone lengths between joints from the estimated 3D pose, and determine the accuracy of the calibration based on the measured bone lengths. A specific embodiment in which the processor 120 determines the accuracy of camera calibration is described in detail with reference to FIGS. 9 to 11, 12A, and 12B.

Figure 4:
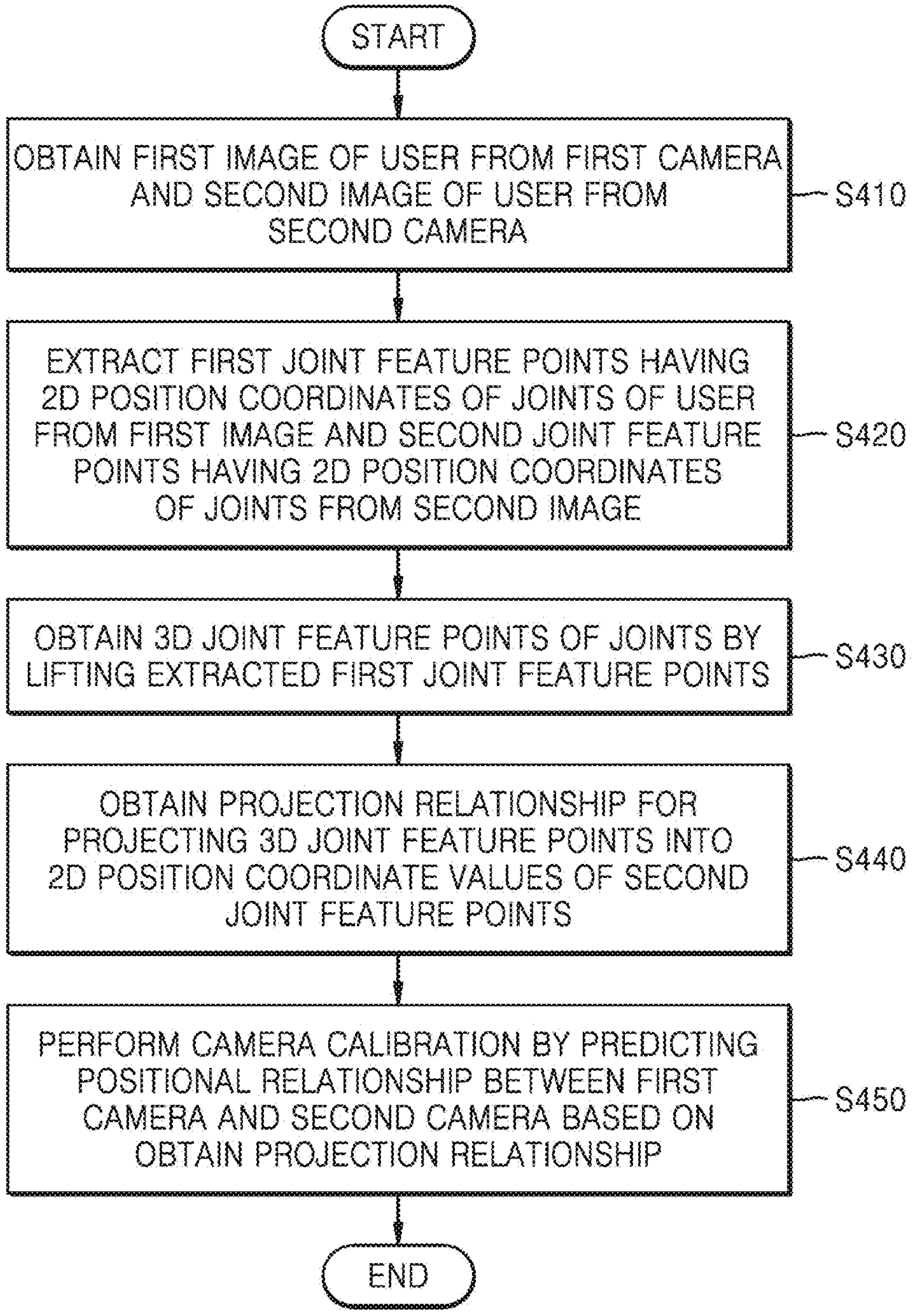
FIG. 4 is a flowchart of a method, performed by an electronic device, of performing calibration according to an embodiment of the disclosure.

FIG. 4 is a flowchart of a method for operating the electronic device 100 according to an embodiment of the disclosure.

In operation S410, the electronic device 100 obtains a first image of a user captured from the first camera, and obtains a second image of the user captured from the second camera. In an embodiment of the disclosure, the electronic device 100 may respectively receive image data of the first image and image data of the second image from the first camera and the second camera via a wired or wireless communication network. The electronic device 100 may receive the first image and the second image from the first camera 210 and the second camera 220, respectively, by using at least one of data communication methods including, for example, wired LAN, wireless LAN, Wi-Fi, Bluetooth, ZigBee, WFD, IrDA, BLE, NFC, WiBro, WiMAX, SWAP, WiGig, and RF communication.

In operation S420, the electronic device 100 extracts first joint feature points, which are 2D position coordinates of joints of the user, from the first image, and second joint feature points, which are 2D position coordinates of the joints, from the second image. In an embodiment of the disclosure, the electronic device 100 may input the first image to an AI model trained to output a plurality of 2D position coordinate values for human joints, e.g., one or more regions included in a head, a neck, arms, shoulders, a waist, knees, legs, or feet, from a 2D image, and obtain first joint feature points via inference using the AI model. Similarly, the electronic device 100 may input the second image to the AI model, and obtain second joint feature points via inference using the AI model. The AI model may be implemented as a DNN model trained, via supervised learning, by applying a 2D image as input data and 2D feature points of human joints included in the 2D image as ground truth. The DNN model may be, for example, a pose estimation model. Because the 'pose estimation model' is the same as described with reference to FIGS. 2 and 3, redundant descriptions are omitted.

In operation S430, the electronic device 100 obtains 3D joint feature points of the joints by lifting the extracted first joint feature points. In an embodiment of the disclosure, the electronic device 100 may input the first joint feature points to an AI model trained, via supervised learning, by applying 2D feature points extracted from an RGB image as input data and 3D position coordinate values corresponding to the 2D feature points as output ground truth, and obtain 3D joint feature points of the joints via inference using the AI model. The AI model may be configured as, for example, a multi-stage CNN model that performs a lifting function and/or operation, but is not limited thereto.

In operation S440, the electronic device 100 obtains a projection relationship for projecting the 3D joint feature points onto the 2D position coordinate values of the second joint feature points. In an embodiment of the disclosure, the electronic device 100 may obtain a projection relationship regarding a rotation direction and a movement distance value for projecting the 3D joint feature points to match the 2D position coordinate values of the second joint feature points. In an embodiment of the disclosure, the 'projection relationship' may include information about a relative positional relationship between the cameras, including a rotation matrix R and a translation vector t.

In operation S450, the electronic device 100 performs camera calibration by predicting a relative positional relationship between the first camera and the second camera based on the obtained projection relationship.

Figure 5:
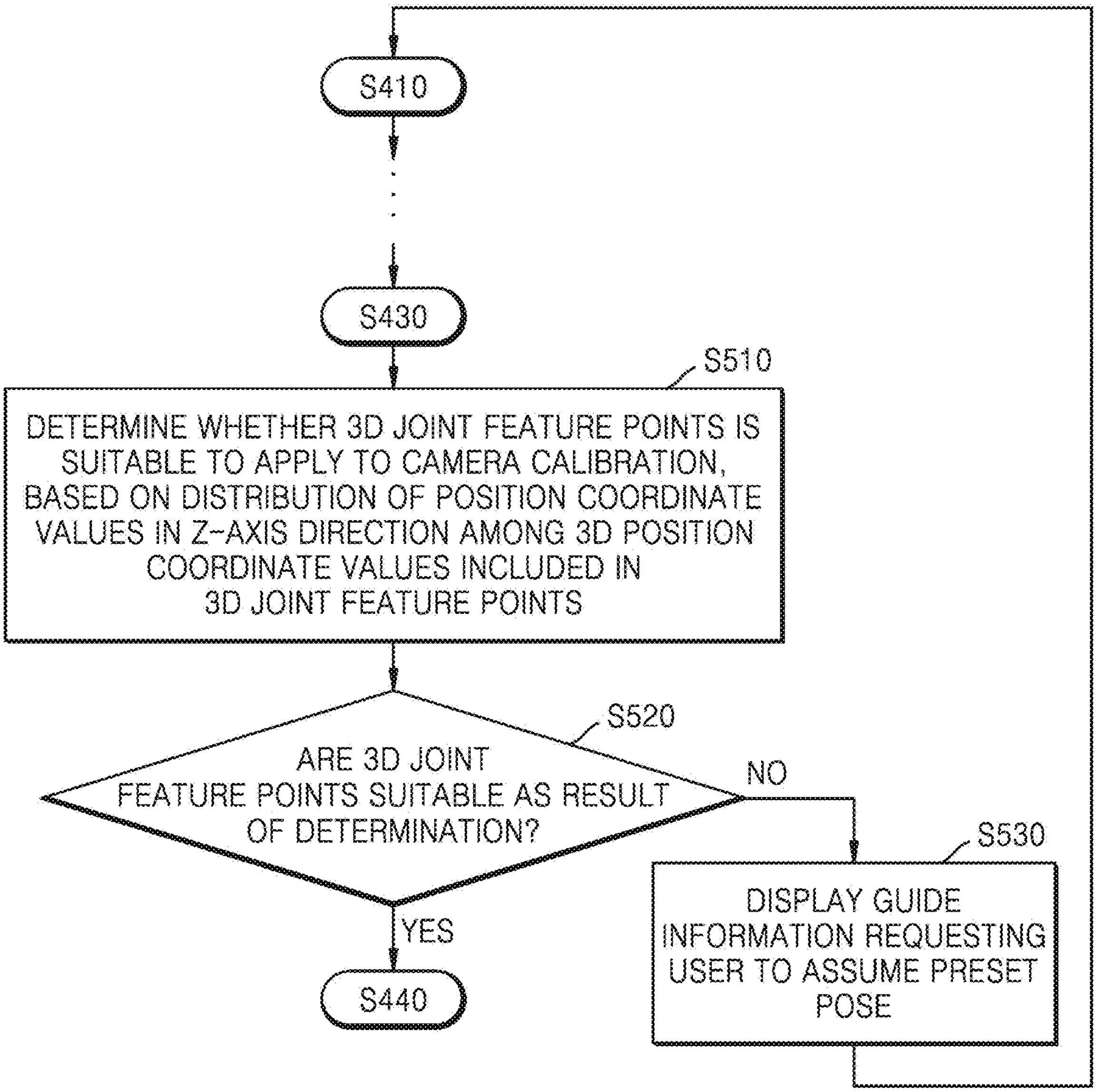
FIG. 5 is a flowchart of a method, performed by an electronic device, of determining whether three-dimensional (3D) joint feature points are suitable to apply to camera calibration according to an embodiment of the disclosure.

FIG. 5 is a flowchart of a method, performed by the electronic device 100, of determining whether 3D joint feature points are suitable to apply to camera calibration according to an embodiment of the disclosure.

Operations S510 to S530 of FIG. 5 may be performed after operation S430 illustrated in FIG. 4 is performed. Operation S440 illustrated in FIG. 4 may be performed after operation S520 or S530 of FIG. 5 is performed.

Figure 6:
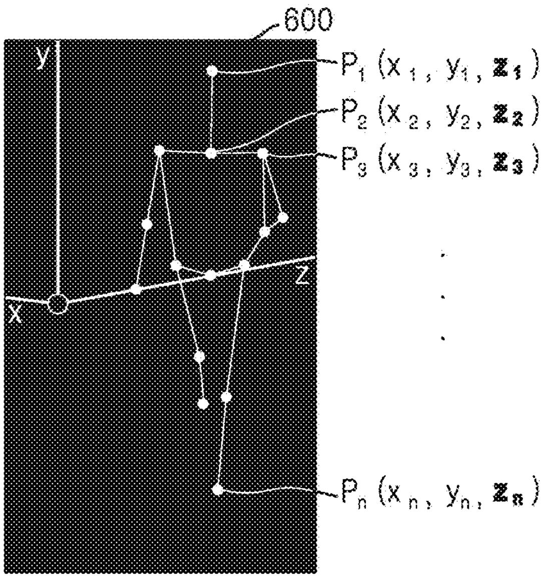
FIG. 6 is a diagram illustrating an operation in which an electronic device determines whether 3D joint feature points are suitable to apply to camera calibration according to an embodiment of the disclosure.

FIG. 6 is a diagram illustrating an operation in which the electronic device 100 determines whether 3D joint feature points $P_1$ to $P_n$ are suitable to apply to camera calibration according to an embodiment of the disclosure.

Hereinafter, operations of the electronic device 100 are described with reference to FIGS. 5 and 6 together.

Referring to FIG. 5, in operation S510, the electronic device 100 determines whether the 3D joint feature points are suitable to apply to camera calibration, based on a distribution of coordinate values in the z-axis direction among 3D position coordinate values included in the 3D joint feature points.

Referring to FIG. 6 in conjunction with FIG. 5, the electronic device 100 may obtain a lifting image 600 including the 3D joint feature points $P_1$ to $P_n$ by lifting the first joint feature points. The 3D joint feature points $P_1$ to $P_n$ may include 3D position coordinate values for the user's joints, e.g., one or more regions included in the head, neck, arms, shoulders, waist, knees, legs, or feet. For example, the first 3D joint feature point $P_1$ may have position coordinate values of $(x_1, y_1, z_1)$, the second 3D joint feature point $P_2$ may have position coordinate values of $(x_2, y_2, z_2)$, and the n-th 3D joint feature point $P_n$ may have position coordinate values of $(x_n, y_n, z_n)$.

The processor (120 of FIG. 2) of the electronic device 100 may determine whether the 3D joint feature points are suitable to apply to camera calibration based on a distribution of coordinate values in the z-axis direction among the 3D position coordinate values included in the 3D joint feature points $P_1$ to $P_n$. In the embodiment illustrated in FIG. 6, the processor 120 may analyze a degree of distribution of $z_1$, which is a coordinate value in the z-axis direction of the first 3D joint feature point $P_1$, $z_2$, which is a coordinate value in the z-axis direction of the second 3D joint feature point $P_2$, . . . , and $z_n$, which is a coordinate value in the z-axis direction of the n-th 3D joint feature point $P_n$, and determine whether the 3D joint feature points $P_1$ to $P_n$ are suitable to apply to camera calibration based on the degree of distribution. In an embodiment of the disclosure, the processor 120 may determine that the larger the degree of distribution of the values of $z_1$ to $z_n$, the more suitable the 3D joint feature points $P_1$ to $P_n$ are for application to camera calibration.

Referring back to FIG. 5, in a case that it is determined, as a result of the determination, that the 3D joint feature points are suitable to apply to camera calibration (operation S520), the electronic device 100 obtains a projection relationship for projecting the 3D joint feature points onto the 2D position coordinate values of the second joint feature points (operation S440).

In a case that it is determined, as a result of the determination, that the 3D joint feature points are not suitable to apply to camera calibration, the electronic device 100 displays guide information requesting the user to assume a predetermined pose (operation S530). In an embodiment of the disclosure, a 'predetermined pose' may be a pose with a large degree of movement in the z-axis direction. The predetermined pose may be set based on a user input, but is not limited thereto. The predetermined pose may be a pose input in advance as guide information. The predetermined pose may be, for example, a pose with one hand extended forward. In an embodiment of the disclosure, the electronic device 100 may further include a display, and the processor (120 of FIG. 2) may control the display to display guide information requesting the user to assume a predetermined pose.

After the guide information is displayed, the electronic device 100 obtains a first image and a second image by recapturing an image of the user assuming the predetermined pose according to the guide information (operation S410).

In order to perform camera calibration by using the 3D joint feature points obtained through lifting, the accuracy of the lifted 3D joint feature points is important. In the embodiments illustrated in FIGS. 5 and 6, the electronic device 100 may determine whether the 3D joint feature points $P_1$ to $P_n$ are accurate values suitable to apply to camera calibration based on the distribution of coordinate values in the z-axis direction among the 3D position coordinate values included in the 3D joint feature points $P_1$ to $P_n$. In addition, according to an embodiment of the disclosure, the electronic device 100 may provide a technical effect of improving the accuracy of camera calibration by displaying guide information that guides the user to assume a pose with a large degree of movement in the z-axis direction when the 3D joint feature points $P_1$ to $P_n$ are not suitable to apply to the camera calibration.

Figure 7:
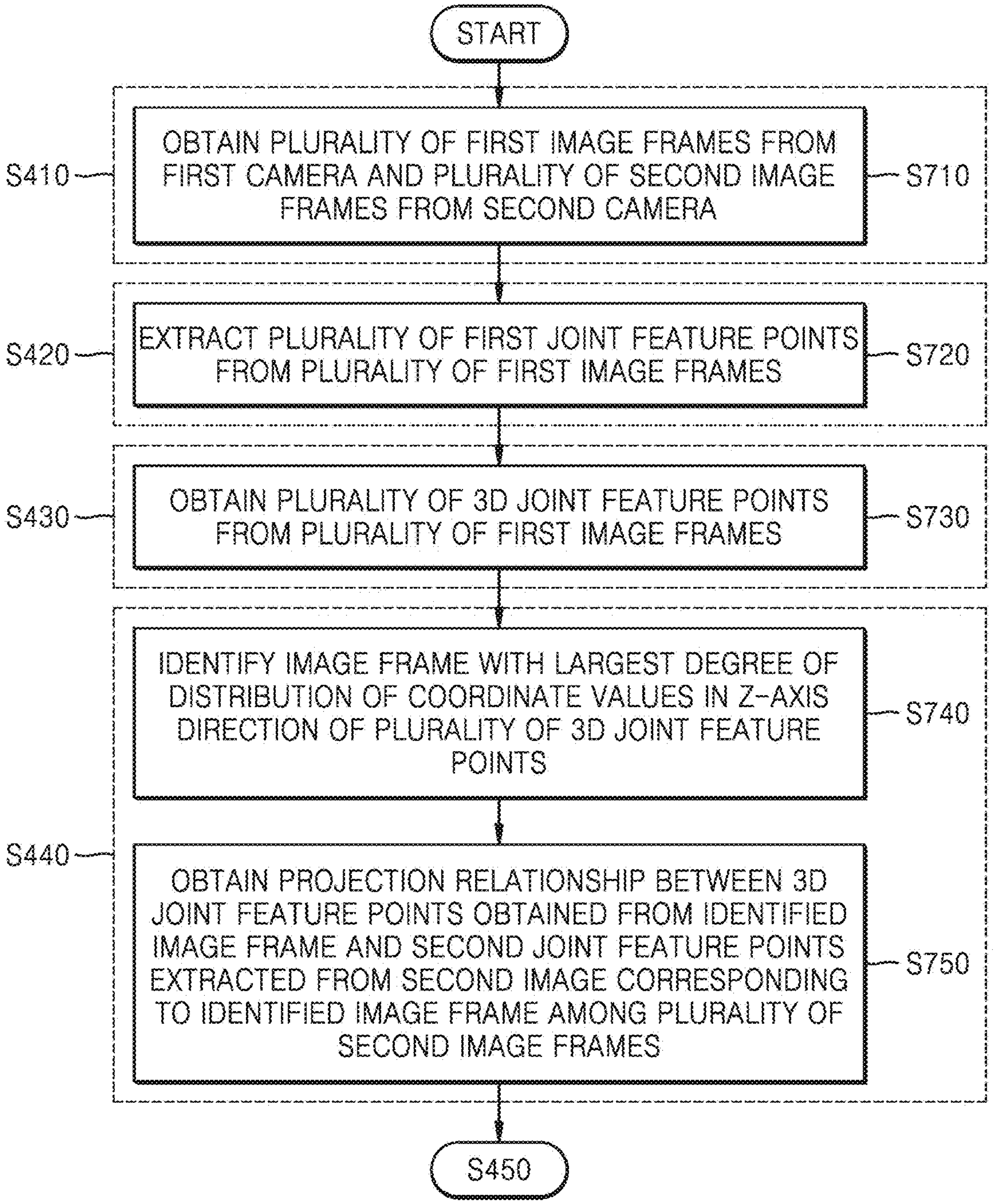
FIG. 7 is a flowchart of a method, performed by an electronic device, of identifying an image frame suitable to apply to camera calibration, from among a plurality of image frames, and performing the camera calibration by using the identified image frame according to an embodiment of the disclosure.

FIG. 7 is a flowchart of a method, performed by the electronic device 100, of identifying an image frame suitable to apply to camera calibration among a plurality of image frames and performing the camera calibration by using the identified image frame according to an embodiment of the disclosure.

Operation S710 illustrated in FIG. 7 is a detailed operation of operation S410 of FIG. 4. Operation S720 illustrated in FIG. 7 is a detailed operation of operation S420 of FIG. 4. Operation S730 illustrated in FIG. 7 is a detailed operation of operation S430 of FIG. 4. Operations S740 and S750 illustrated in FIG. 7 are detailed operations of operation S440 of FIG. 4.

Figure 8:
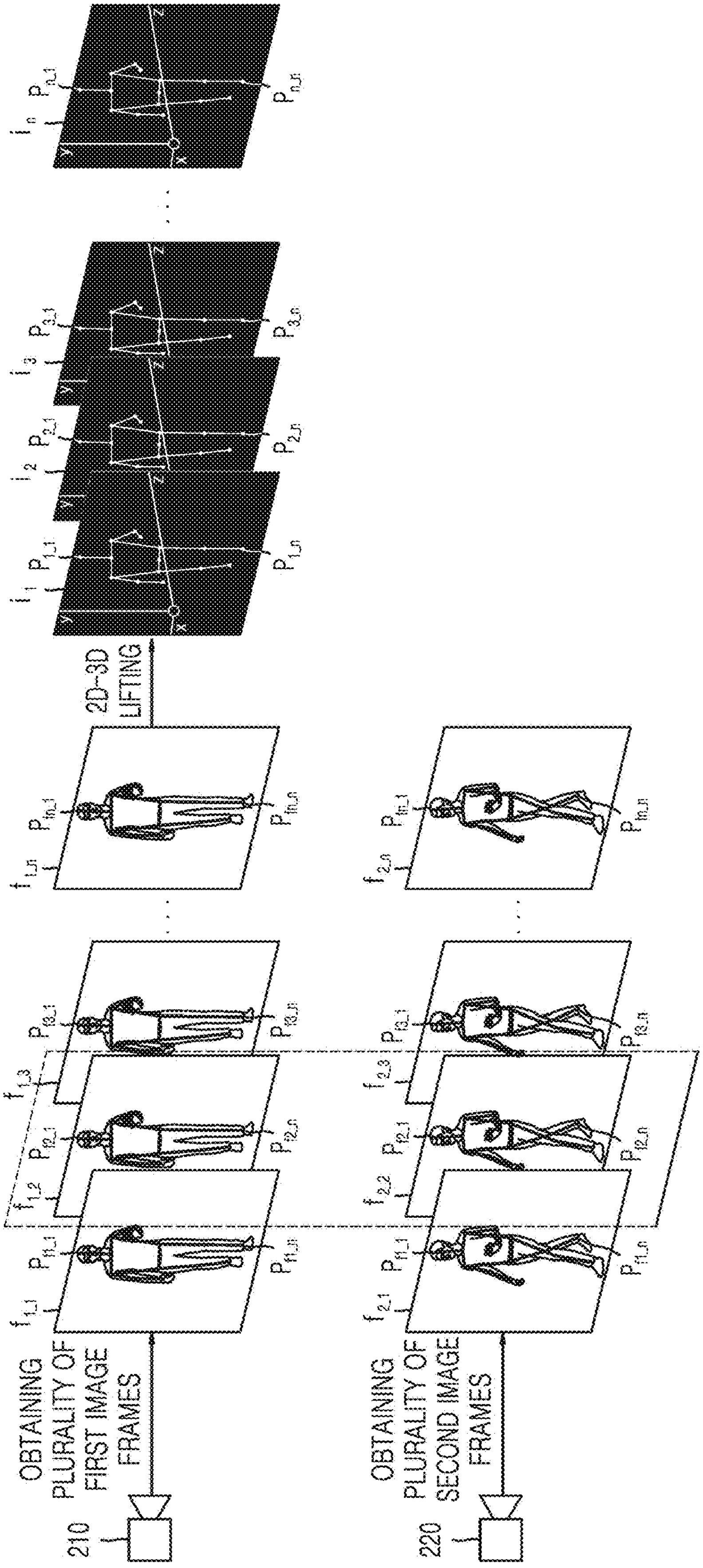
FIG. 8 is a diagram illustrating an operation in which an electronic device identifies an image frame suitable to apply to camera calibration, from among a plurality of image frames according to an embodiment of the disclosure.

FIG. 8 is a diagram illustrating an operation in which the electronic device 100 identifies an image frame suitable to apply to camera calibration among a plurality of image frames $f_{1\_1}$ to $f_{1\_n}$ and $f_{2-\_1}$ to $f_{2\_n}$ according to an embodiment of the disclosure.

Hereinafter, operations of the electronic device 100 are described with reference to FIGS. 7 and 8 together.

Referring to FIG. 7, in operation S710, the electronic device 100 obtains a plurality of first image frames from the first camera 210 and a plurality of second image frames from the second camera 220. Referring to FIG. 8 in conjunction with FIG. 7, the electronic device 100 may obtain a plurality of first image frames $f_{1\_1}$ to $f_{1\_n}$ captured by the first camera 210 over a period of time, and obtain a plurality of second image frames $f_{2\_1}$ to $f_{2\_n}$ captured by the second camera 220 over the period of time. The plurality of first image frames $f_{1\_1}$ to $f_{1\_n}$ and the plurality of second image frames $f_{2\_1}$ to $f_{2\_n}$ may include information about a 2D pose of the user that reflects the user's movement over time.

In operation S720 of FIG. 7, the electronic device 100 extracts a plurality of first joint feature points from each of the plurality of first image frames. Referring to FIG. 8 in conjunction with FIG. 7, the processor (120 of FIG. 2) of the electronic device 100 may extract a plurality of first joint feature points that are 2D position coordinate values of a plurality of joints from each of the plurality of first image frames $f_{1\_1}$ to $f_{1\_n}$ by using a trained AI model. In an embodiment of the disclosure, the processor 120 may extract a plurality of first joint feature points from each of the plurality of first image frames $f_{1\_1}$ to $f_{1\_n}$ by using a pose estimation model. Because a specific method by which the processor 120 extracts joint feature points from an image by using an AI model is the same as the method described with reference to FIGS. 2 to 4, redundant descriptions are omitted. In the embodiment illustrated in FIG. 8, the processor 120 may extract first joint feature points $P_{f1\_1}$ to $P_{f1\_n}$ from the 1st-1 image frame $f_{1\_1}$ among the plurality of first image frames $f_{1\_1}$ to $f_{1\_n}$, extract first joint feature points $P_{f2\_1}$ to $P_{f2\_n}$ from the 1st-2 image frame $f_{1\_2}$, and extract first joint feature points $P_{fn\_1}$ to $P_{fn\_n}$ from the 1st-n image frame $f_{1\_n}$.

In operation S730 of FIG. 7, the electronic device 100 obtains a plurality of 3D joint feature points by lifting the plurality of first joint feature points. Referring to FIG. 8 in conjunction with FIG. 7, by perform 2D-3D lifting, the processor 120 may obtain a plurality of 3D joint feature points, which are 3D position coordinate values from the plurality of first joint feature points. A method by which the processor 120 performs lifting is the same as the method described with reference to FIGS. 2 to 4, and thus, redundant descriptions are omitted. In the embodiment illustrated in FIG. 8, the processor 120 may obtain a first lifting image $i_1$ including 3D joint feature points $P_{1\_1}$ to $P_1$_n by lifting the first joint feature points $P_{f1\_1}$ to $P_{f1\_n}$ in the 1st-1 image frame $f_{1\_1}$, obtain a second lifting image $i_2$ including 3D joint feature points $P_{2\_1}$ to $P_{2\_n}$ by lifting the first joint feature points $P_{f2\_1}$ to $P_{f2\_n}$ in the 1st-2 image frame $f_{1\_2}$, and obtain an n-th lifting image in including 3D joint feature points $P_{n\_1}$ to $P_{n\_n}$ by lifting the first joint feature points $P_{fn\_1}$ to $P_{fn\_n}$ in the 1st-n image frame $f_{1\_n}$.

In operation S740 of FIG. 7, the electronic device 100 identifies an image frame with a largest degree of distribution of coordinate values in the z-axis direction of the plurality of 3D joint feature points. In an embodiment of the disclosure, the processor 120 may identify, among the plurality of lifting images $i_1$ to in, a lifting image with a largest degree of distribution of z-axis coordinate values among a plurality of 3D position coordinate values included in the 3D joint feature points. The processor 120 may identify which image frame of the plurality of first image frames $f_{1\_1}$ to $f_{1\_n}$ corresponds to the identified lifting image, and determine an image frame corresponding to the identified image frame among the plurality of second image frames $f_{2\_1}$ to $f_{2\_n}$. Here, the 'corresponding image frame' may mean an image frame obtained at the same time point as a time point at which the identified image frame is obtained. For example, when a lifting image having a largest distribution of z-axis coordinate values is obtained by converting the 1st-2 image frame $f_{1\_2}$ among the plurality of first image frames $f_{1\_1}$ to $f_{1\_n}$, an image frame corresponding to the 1st-2 image frame $f_{1\_2}$ may be a 2nd-2 image frame $f_{2\_2}$ obtained by the second camera 220 at the same time point as the 1st-2 image frame $f_{1\_2}$ is obtained. The processor 120 may determine an image corresponding to the 1st-2 image frame $f_{1\_2}$ among the plurality of second image frames $f_{2\_1}$ to $f_{2\_n}$ as the 2nd-2 image frame $f_{2\_2}$.

In operation S750 of FIG. 7, the electronic device 100 obtains a projection relationship between 3D joint coordinate values obtained from the identified image frame and second joint feature points extracted from a second image frame corresponding to the identified image frame among the plurality of second image frames. In the embodiment illustrated in FIG. 8, when a lifting image having a largest degree of distribution of z-axis coordinate values among the plurality of 3D position coordinate values included in the 3D joint feature points among the plurality of lifting images in to in is identified as a second lifting image $i_2$ corresponding to the 1st-1 image frame $f_{1\_2}$, the processor 120 may obtain a projection relationship between the 3D joint feature points $P_{2\_1}$ to $P_{2\_n}$ included in the second lifting image $i_2$ and second joint feature points $P_{f2\_1}$ to $P_{f2\_n}$ extracted from the 2nd-2 image frame $f_{2\_2}$ determined as an image corresponding to the 1st-2 image frame $f_{1\_2}$ among the plurality of second image frames $f_{2\_1}$ to $f_{2\_n}$ obtained by the second camera 220.

In order to perform camera calibration by using 3D joint feature points obtained through lifting, the accuracy of the obtained 3D joint feature points is important. According to the embodiments illustrated in FIGS. 7 and 8, the electronic device 100 may lift the plurality of first joint feature points extracted from the plurality of first image frames $f_{1\_1}$ to $f_{1\_n}$ obtained by the first camera 210 over a certain period of time, identify, among the plurality of lifting images $i_1$ to $i_n$, a lifting image having a largest degree of distribution of coordinate values in the z-axis direction among the 3D joint feature points, and perform camera calibration by using 3D joint feature points in the identified lifting image, thereby improving accuracy of the calibration.

Figure 9:
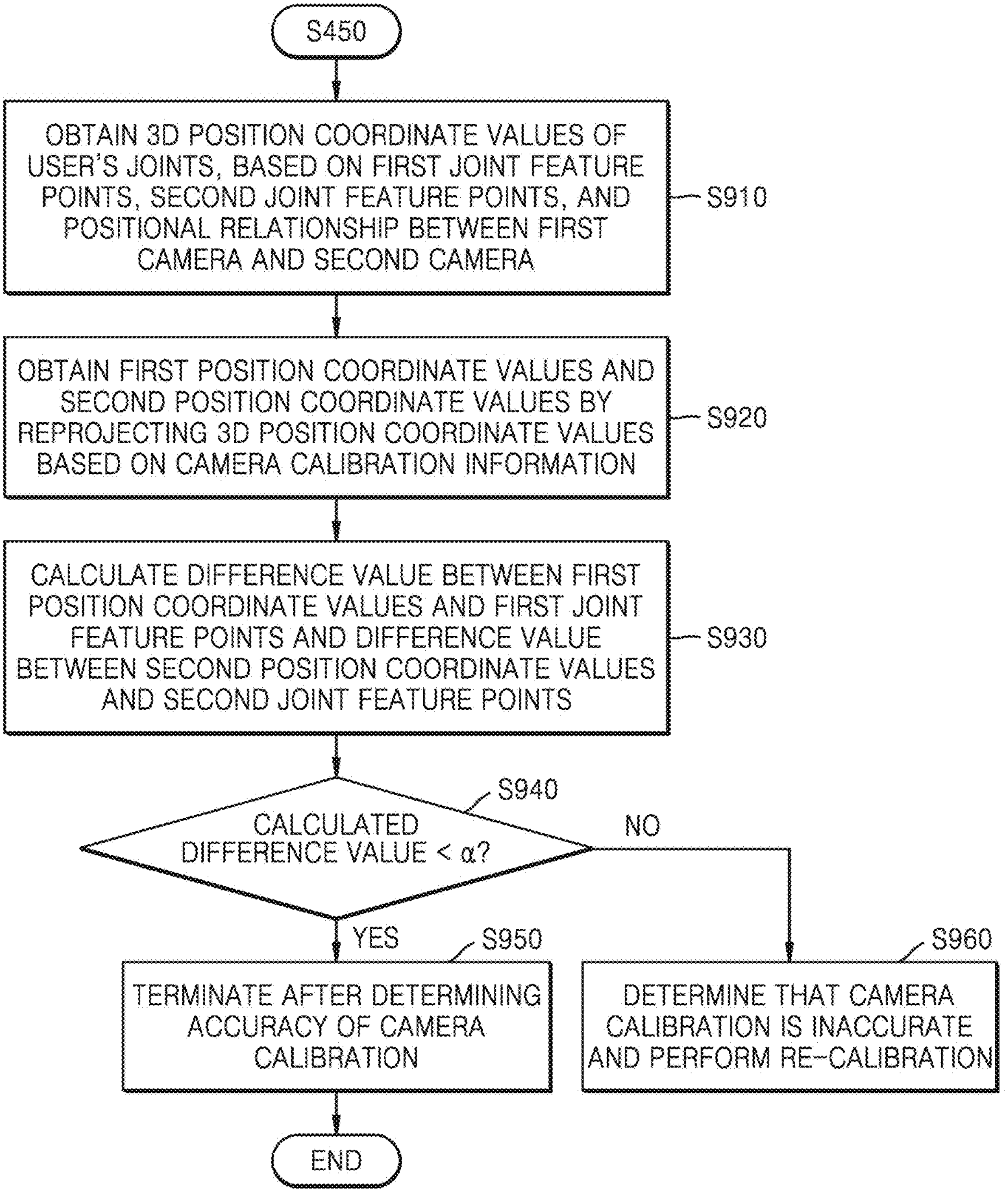
FIG. 9 is a flowchart of a method, performed by an electronic device, of determining the accuracy of camera calibration through reprojection according to an embodiment of the disclosure.

FIG. 9 is a flowchart of a method, performed by the electronic device 100, of determining the accuracy of camera calibration through reprojection according to an embodiment of the disclosure.

Operations S910 to S960 illustrated in FIG. 9 are performed after operation S450 illustrated in FIG. 4 is performed.

Figure 10:
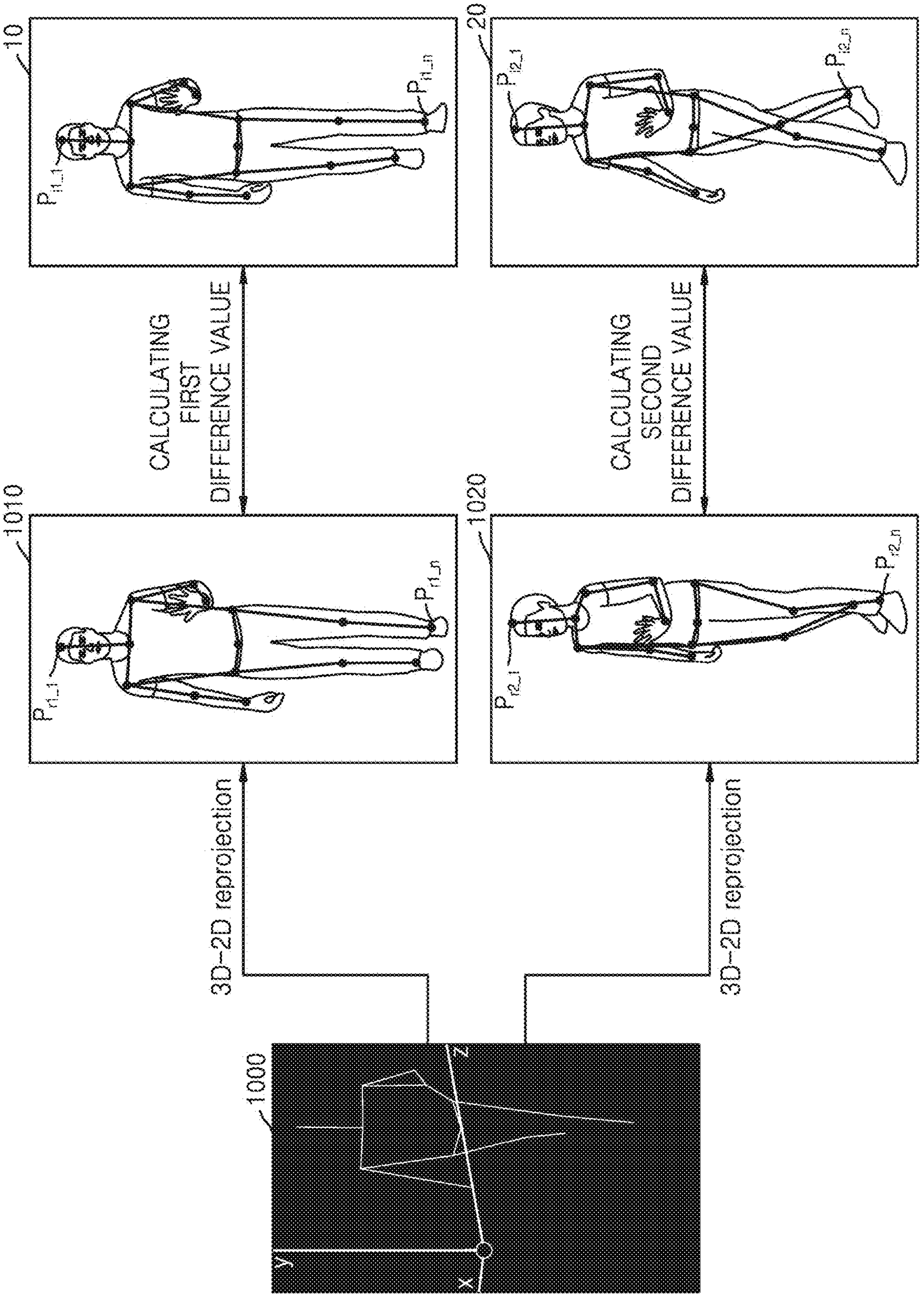
FIG. 10 is a diagram illustrating an operation in which an electronic device determines the accuracy of camera calibration through reprojection according to an embodiment of the disclosure.

FIG. 10 is a diagram illustrating an operation in which the electronic device 100 determines the accuracy of camera calibration through reprojection according to an embodiment of the disclosure.

Hereinafter, the operation in which the electronic device 100 determines the accuracy of camera calibration is described with reference to FIGS. 9 and 10 together.

Referring to FIG. 9, in operation S910, the electronic device 100 obtains 3D position coordinate values of the user's joints, based on the first joint feature points, the second joint feature points, and the positional relationship between the first camera and the second camera. In an embodiment of the disclosure, the electronic device 100 may use triangulation to calculate 3D position coordinate values of the joints, based on the first joint feature points that are the 2D position coordinate values extracted from the first image, the second joint feature points that are the 2D position coordinate values extracted from the second image, and the relative positional relationship between the cameras. Referring to FIG. 10 in conjunction with FIG. 9, the processor (120 of FIG. 2) of the electronic device 100 may obtain a 3D image 1000 including the 3D position coordinate values of the user's joints calculated using the triangulation. The processor 120 may estimate a 3D pose of the user based on the 3D position coordinate values included in the 3D image 1000.

In operation S920 of FIG. 9, the electronic device 100 obtains first position coordinate values and second position coordinate values by reprojecting the 3D position coordinate values based on camera calibration information. Referring to FIG. 10 together, the processor 120 may reproject the 3D position coordinate values onto 2D position coordinate values by using a rotation matrix R and a translation matrix t included in the camera calibration information. The processor 120 may obtain a reprojected image 1010 including first joint feature points $P_{r1\_1}$ to $P_{r1\_n}$ having first position coordinate values by reprojecting the 3D image 1000 based on a position and an orientation of the first camera by using the camera calibration information. Similarly, the processor 120 may obtain a reprojected image 1020 including second joint feature points $P_{r2\_1}$ to $P_{r2\_n}$ having second position coordinate values by reprojecting the 3D image 1000 based on a position and an orientation of the second camera by using the camera calibration information.

In operation S930 of FIG. 9, the electronic device 100 calculates a difference value between the first position coordinate values and the first joint feature points and a difference value between the second position coordinate values and the second joint feature points. Referring to FIG. 10 together, the processor 120 may calculate a first difference value between the first position coordinate values $P_{r1\_1}$ to $P_{r1\_n}$ obtained through the reprojection and the first joint feature points $P_{i1\_1}$ to $P_{i1\_n}$ extracted from the first image 10. Furthermore, the processor 120 may calculate a second difference value between the second position coordinate values $P_{r2\_1}$ to $P_{r2\_n}$ obtained through the reprojection and the second joint feature points $P_{i2\_1}$ to $P_{i2\_n}$ extracted from the second image 20.

In operation S940 of FIG. 9, the electronic device 100 compares the calculated difference values with a predetermined threshold α. Referring to FIG. 10 together, the processor 120 may compare at least one of the calculated first difference value and second difference value with the predetermined threshold α.

In a case that the difference value is less than the threshold α (operation S950) as a result of the comparison, the electronic device 100 determines accuracy of the camera calibration and then terminates the process. In an embodiment of the disclosure, when the difference value is less than the threshold α, the processor 120 may determine that the camera calibration was performed inaccurately.

In a case that the difference value is greater than or equal to the threshold α as a result of the comparison (operation S960), the electronic device 100 determines that the camera calibration is inaccurate and performs re-calibration. Referring to the embodiment illustrated in FIG. 10, in a case that at least one of the calculated first difference value and second difference value is greater than or equal to the threshold α, the processor 120 may determine that the camera calibration is inaccurate. In a case that it is determined that the camera calibration was performed inaccurately, the processor 120 may determine to perform re-calibration.

Figure 11:
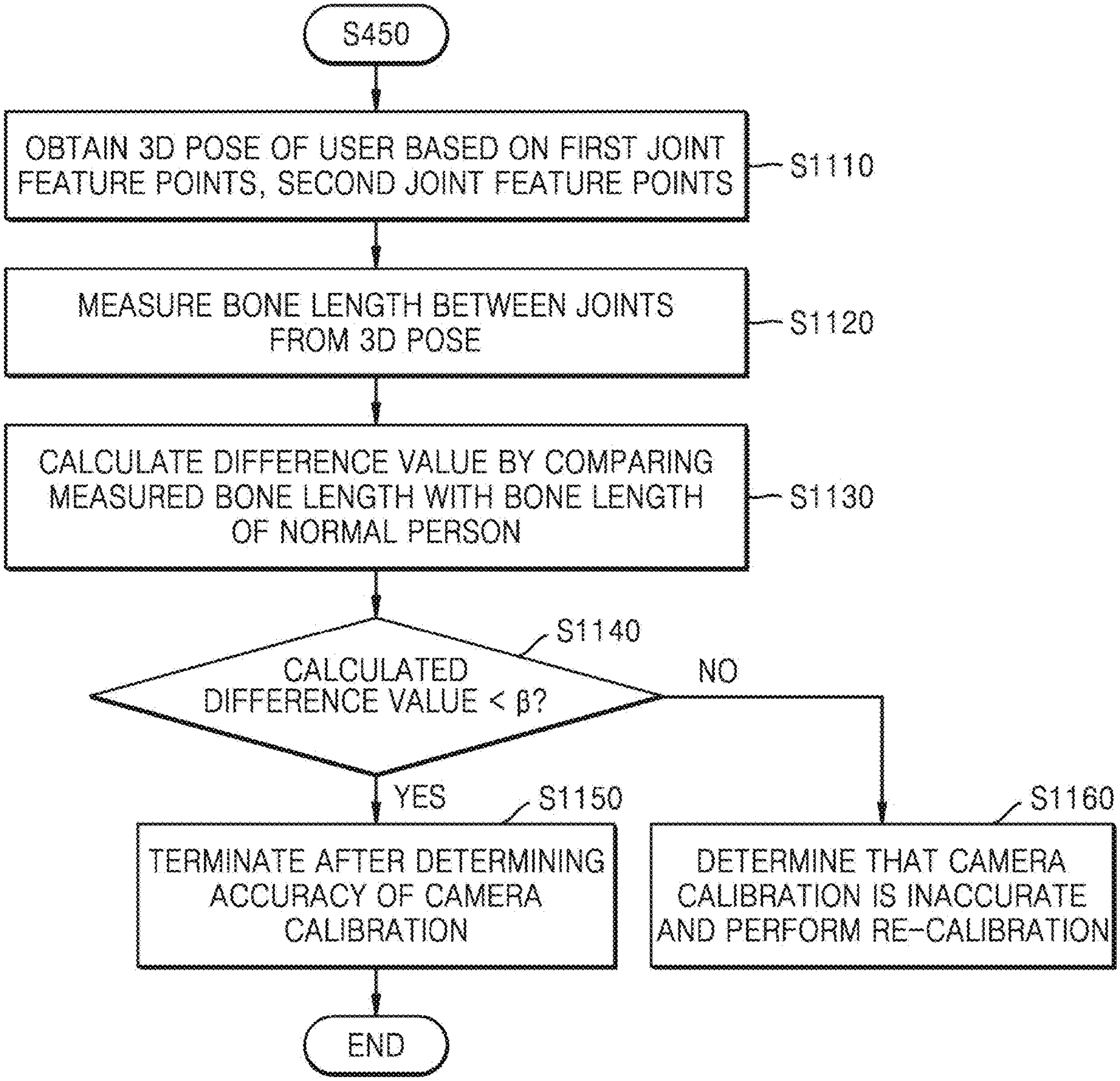
FIG. 11 is a flowchart of a method, performed by an electronic device, of obtaining a 3D pose of a user and determining accuracy of camera calibration from the obtained 3D pose according to an embodiment of the disclosure.

FIG. 11 is a flowchart of a method, performed by the electronic device 100, of obtaining a 3D pose of a user and determining accuracy of camera calibration from the obtained 3D pose according to an embodiment of the disclosure.

Operations S1110 to S1160 illustrated in FIG. 11 are performed after operation S450 illustrated in FIG. 4 is performed.

In operation S1110, the electronic device 100 obtains a 3D pose of the user based on the first joint feature points, the second joint feature points, and the positional relationship between the first camera and the second camera. In an embodiment of the disclosure, the processor 120 may use triangulation to calculate 3D position coordinate values of the joints, based on the first joint feature points, which are the 2D position coordinate values extracted from the first image, the second joint feature points, which are the 2D position coordinate values extracted from the second image, and the relative positional relationship between the cameras. The electronic device 100 may obtain a 3D pose of the user based on the calculated 3D position coordinate values of the joints.

In operation S1120, the electronic device 100 measures a bone length between joints from the 3D pose. In an embodiment of the disclosure, the processor (120 of FIG. 2) of the electronic device 100 may obtain a bone length between joints by measuring a distance between 3D position coordinate values included in the 3D pose.

Figure 12A:
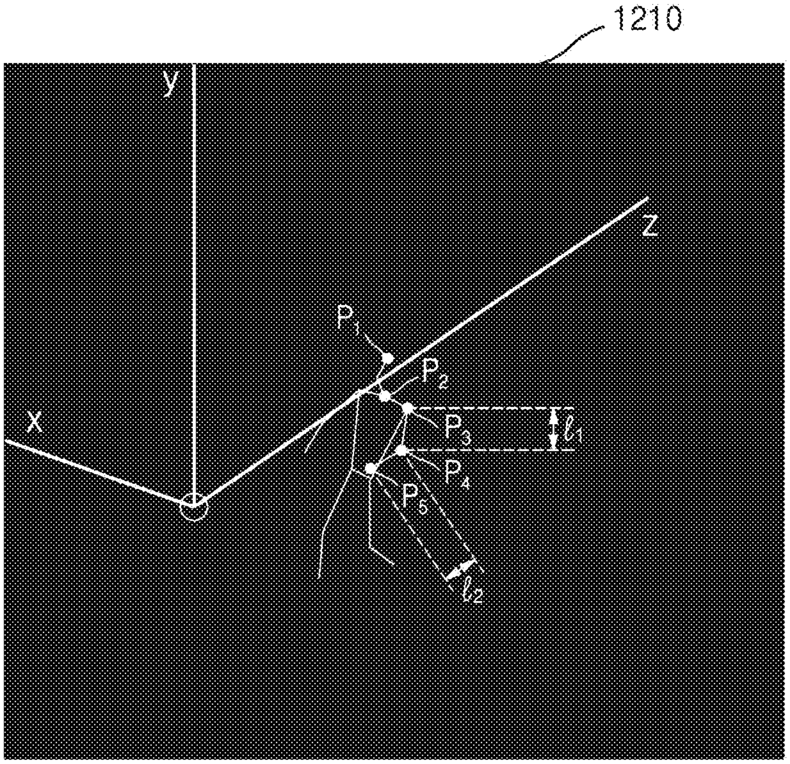
FIG. 12A is a diagram illustrating a 3D pose obtained according to a result of accurately performing camera calibration according to an embodiment of the disclosure.

FIG. 12A is a diagram illustrating a 3D pose obtained according to a result of accurately performing camera calibration according to an embodiment of the disclosure.

Referring to operation S1120 in conjunction with FIG. 12A, the processor 120 may measure a bone length between joints from a 3D image 1210 showing the 3D pose. For example, the processor 120 may obtain information about a first length $l_1$, which is a length of the humerus, by measuring a distance between 3D position coordinate values of a third feature point $P_3$ representing a shoulder in the 3D image 1210 and 3D position coordinate values of a fourth feature point $P_4$ representing an elbow therein. Furthermore, the processor 120 may obtain information about a second length $l_2$, which is a length of the radius or ulna, by measuring a distance between the 3D position coordinate value of the fourth feature point $P_4$ and 3D position coordinate values of a fifth feature point $P_5$ representing a wrist in the 3D image 1210.

Referring back to FIG. 11, in operation S1130, the electronic device 100 calculate a difference value by comparing the measured bone length with a bone length of a normal person. In an embodiment of the disclosure, the electronic device 100 may obtain information about bone lengths according to a standard body shape of normal people. For example, the electronic device 100 may obtain standard human body dimensions or human body standard information, and obtain information about bone lengths of an ordinary person from the obtained standard human body dimensions or human body standard information. However, the disclosure is not limited thereto, and the electronic device 100 may store, in the memory (130 of FIG. 2), data regarding bone lengths of a normal person in advance. Referring together to the embodiment illustrated in FIG. 12A, the processor 120 may compare the measured first length $l_1$ with a standard humerus length of a normal person, and compare the second length $l_2$ with a standard radial or ulna length of a normal person.

In operation S1140 of FIG. 11, the electronic device 100 compares the calculated difference value with a predetermined threshold β.

In a case that the difference value is less than the threshold β (operation S1150) as a result of the comparison, the electronic device 100 determines accuracy of the camera calibration and then terminates the process. In an embodiment of the disclosure, in a case that the difference value is less than the threshold β, the processor 120 may determine that the camera calibration was performed accurately. Referring to FIG. 12A in conjunction with FIG. 11, in a case that a first difference value between the measured first length $l_1$ and the standard humerus length is less than the threshold β, and a second difference value between the measured second length $l_2$ and the standard radial length is less than the threshold β, the processor 120 may determine that the camera calibration has been accurately performed.

In a case that the difference value is greater than or equal to the threshold β as a result of the comparison (operation S1160), the electronic device 100 determines that the camera calibration is inaccurate and performs re-calibration.

Figure 12B:
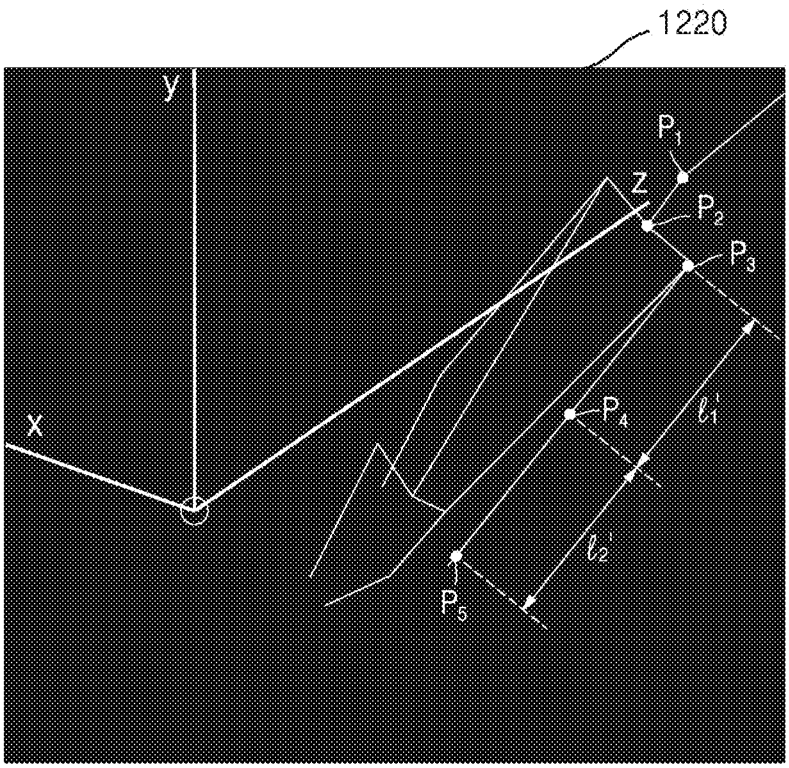
FIG. 12B is a diagram illustrating a 3D pose that requires re-calibration due to inaccurate camera calibration according to an embodiment of the disclosure.

FIG. 12B is a diagram illustrating a 3D pose that requires re-calibration due to inaccurate camera calibration according to an embodiment of the disclosure.

Referring FIG. 12B in conjunction with to operation S1160, the processor 120 may measure a bone length between joints from a 3D image 1220 showing the 3D pose. For example, the processor 120 may obtain information about a first length $l_1'$ by measuring a distance between 3D position coordinate values of a third feature point $P_3$ and 3D position coordinate values of a fourth feature point $P_4$ in the 3D image 1220, and obtain information about a second length $l_2'$ by measuring a distance between 3D position coordinate values of the fourth feature point $P_4$ and 3D position coordinate values of a fifth feature point $P_5$. The processor 120 may calculate a difference value by comparing the first length $l_1'$ with a standard humerus length of a normal person, and calculate a difference value by comparing the second length $l_2'$ with a standard radial or ulna length of a normal person. In a case that the calculated difference values are greater than or equal to the threshold β, the processor 120 may determine that the camera calibration is inaccurate. In a case that it is determined that the camera calibration has been inaccurately performed, the processor 120 may determine to perform re-calibration.

In the embodiments illustrated in FIGS. 9 to 11, 12A, and 12B, the electronic device 100 may determine the accuracy of the camera calibration, and in a case that it is determined that the camera calibration was performed inaccurately, the electronic device 100 may determine to perform re-calibration. Therefore, according to an embodiment of the disclosure, the electronic device 100 may prevent camera calibration errors in advance and improve the accuracy of calibration.

Figure 13:
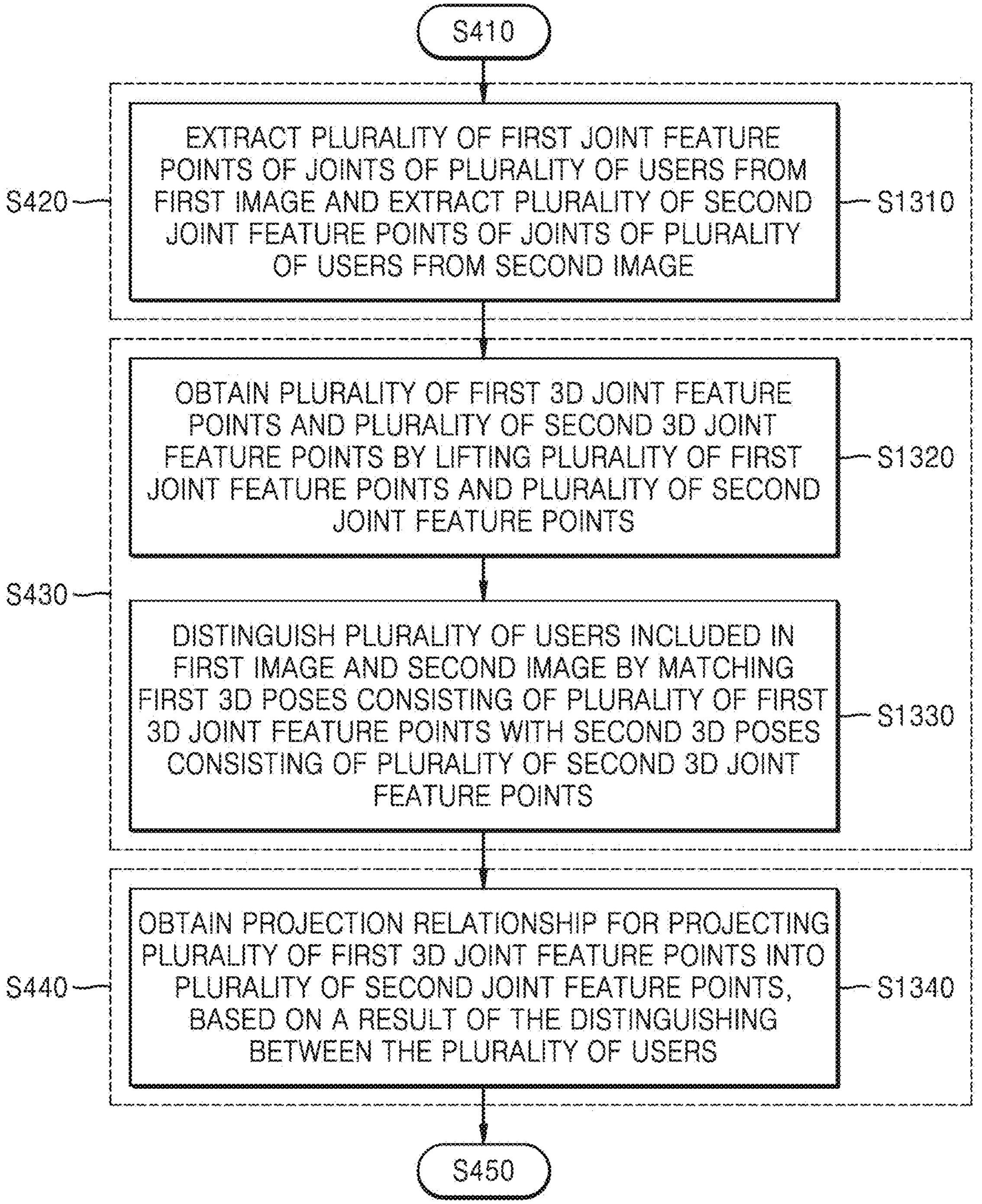
FIG. 13 is a flowchart of a method, performed by an electronic device, of extracting a plurality of feature points from an image including a plurality of users and performing camera calibration by using the extracted plurality of feature points according to an embodiment of the disclosure.

FIG. 13 is a flowchart of a method, performed by the electronic device 100, of extracting a plurality of feature points from an image including a plurality of users and performing camera calibration by using the extracted plurality of feature points according to an embodiment of the disclosure.

Operation S1310 illustrated in FIG. 13 is a detailed operation of operation S420 illustrated in FIG. 4. Operations S1320 and S1330 illustrated in FIG. 13 are detailed operations of operation S430 illustrated in FIG. 4. Operation S1340 illustrated in FIG. 13 is a detailed operation of operation S440 illustrated in FIG. 4. After operation S1340 illustrated in FIG. 13 is performed, operation S450 of FIG. 4 is performed.

Figure 14:
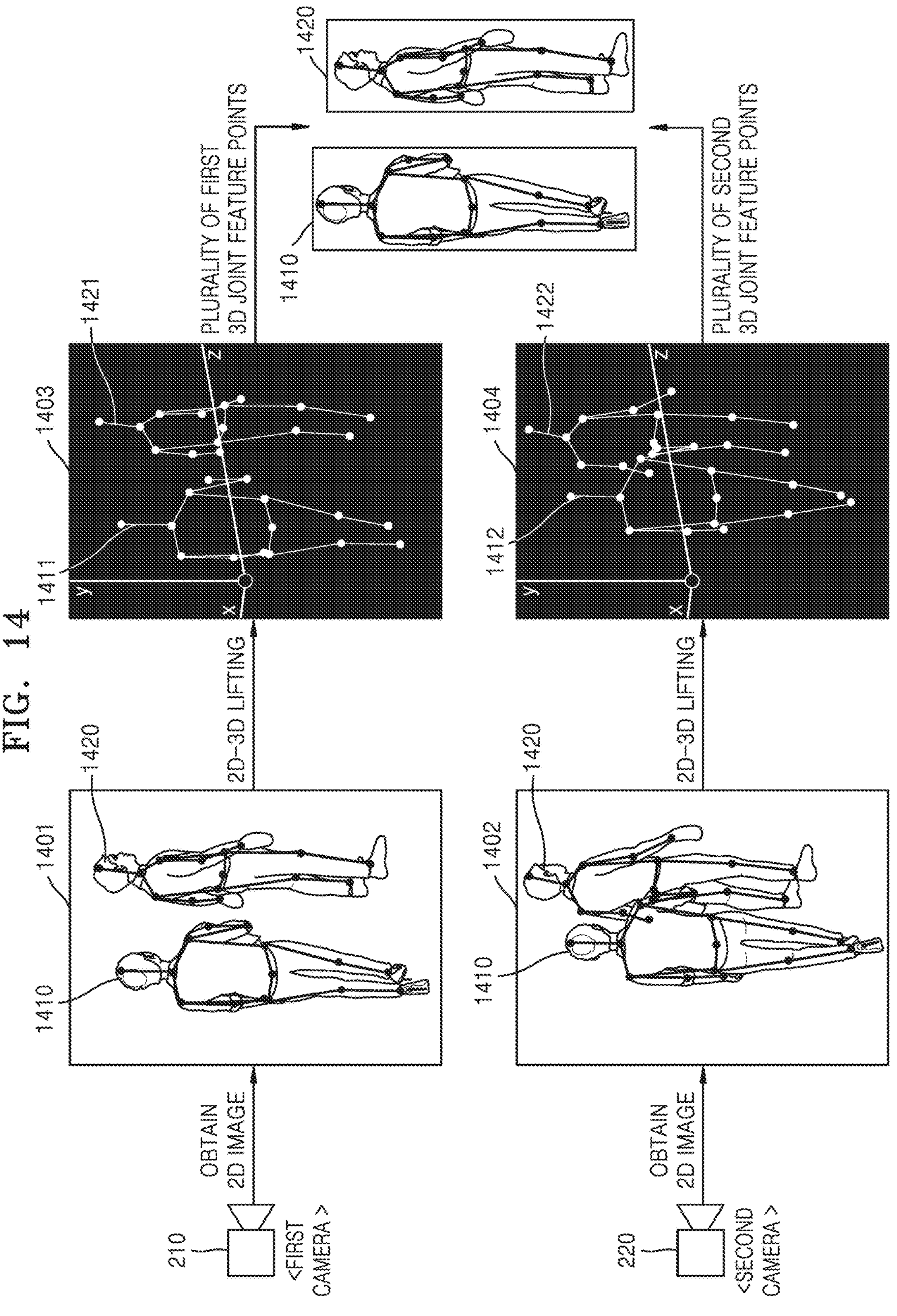
FIG. 14 is a diagram illustrating an operation in which an electronic device extracts a plurality of feature points from an image including a plurality of users and distinguishes the plurality of users by using the extracted plurality of feature points according to an embodiment of the disclosure.

FIG. 14 is a diagram illustrating operations in which the electronic device 100 extracts a plurality of feature points from images 1401 and 1402 each including a plurality of users 1410 and 1420 and distinguishes the plurality of users 1410 and 1420 by using the extracted plurality of feature points according to an embodiment of the disclosure.

Hereinafter, an operation in which an electronic device 100 distinguishes the plurality of users 1410 and 1420 in the images 1401 and 1402 is described with reference to FIGS. 13 and 14 together.

Referring to FIG. 13, in operation S1310, the electronic device 100 extracts a plurality of first joint feature points of joints of a plurality of users from the first image, and extracts a plurality of second joint feature points of the joints of the plurality of users from the second image. Referring to FIG. 14 in conjunction with FIG. 13, the processor (120 of FIG. 2) of the electronic device 100 may extract first joint feature points of the first user 1410 and first joint feature points of the second user 1420 from the first image 1401 captured by the first camera 210. Furthermore, the processor 120 may extract second joint feature points of the first user 1410 and second joint feature points of the second user 1420 from the second image 1402 captured by the second camera 220. A method by which the electronic device 100 extracts joint feature points from the first image 1401 and the second image 1402 is the same as the method described with reference to FIGS. 2 to 4, and thus, redundant descriptions are omitted.

In operation S1320 of FIG. 13, the electronic device 100 obtains a plurality of first 3D joint feature points and a plurality of second 3D joint feature points by respectively lifting the plurality of first joint feature points and the plurality of second joint feature points. Referring to FIG. 14 in conjunction with FIG. 13, by performing 2D-3D lifting, the processor 120 may obtain, from the plurality of first joint feature points extracted from the first image 1401, a 3D image 1403 including a plurality of first 3D joint feature points 1411 and 1421, which are 3D position coordinate values of the joints of the plurality of users 1410 and 1420. The first 3D image 1403 may include the first 3D joint feature points 1411 and 1421 of the plurality of users 1410 and 1420. The processor 120 may obtain the first 3D joint feature points 1411 by lifting the first joint feature points that are 2D position coordinate values of the joints of the first user 1410 extracted from the first image 1401, and obtain the first 3D joint feature points 1421 by lifting the first joint feature points that are 2D position coordinate values of the joints of the second user 1420. A second 3D image 1404 may include second 3D joint feature points 1412 and 1422 of the plurality of users 1410 and 1420. The processor 120 may obtain the second 3D joint feature points 1412 by lifting the second joint feature points that are 2D position coordinate values of the joints of the first user 1410 extracted from the second image 1402, and obtain the second 3D joint feature points 1422 by lifting the second joint feature points that are 2D position coordinate values of the joints of the second user 1420. Because a specific method by which the processor 120 obtains 3D joint feature points by lifting 2D joint feature points is the same as described with reference to FIGS. 2 to 4, redundant descriptions are omitted.

In operation S1330 of FIG. 13, the electronic device 100 distinguishes the plurality of users included in the first image and the second image by matching a first 3D pose consisting of the plurality of first 3D joint feature points with a second 3D pose consisting of the plurality of second 3D joint feature points. Referring to the embodiment illustrated in FIG. 14 in conjunction with FIG. 13, the processor 120 may estimate first 3D poses of the first user 1410 and the second user 1420 based on the plurality of first 3D joint feature points 1411 and 1421, and estimate second 3D poses of the first user 1410 and the second user 1420 based on the plurality of second 3D joint feature points 1412 and 1422. The processor 120 may match corresponding poses based on the estimated first 3D poses and second 3D poses, and distinguish a 3D pose of the first user 1410 from a 3D pose of the second user 1420 based on a result of the matching.

In operation S1340 of FIG. 13, the electronic device 100 obtains a projection relationship for respectively projecting the plurality of first 3D joint feature points onto the plurality of second joint feature points, based on a result of the distinguishing of the plurality of users. Referring to the embodiment illustrated in FIG. 14, the processor 120 may obtain, based on a result of the distinguishing between the first user 1410 and the second user 1420, a projection relationship for projecting the first 3D joint feature points 1411 of the first user 1410 obtained via the lifting onto the second joint feature points that are the 2D position coordinate values of the first user 1410 extracted from the second image 1402. Furthermore, the processor 120 may obtain a projection relationship for projecting the first 3D joint feature points 1421 of the second user 1420 obtained via the lifting onto the second joint feature points that are the 2D position coordinate values of the second user 1420 extracted from the second image 1402. A method by which the processor 120 obtains a projection relationship is the same as the method described with reference to FIGS. 2 to 4, and thus, redundant descriptions are omitted.

The electronic device 100 performs camera calibration based on the obtained projection relationship (operation S450).

In the embodiments illustrated in FIGS. 13 and 14, the electronic device 100 estimates 3D poses of the plurality of users 1410 and 1420, distinguishes the first user 1410 from the second user 1420 based on the 3D poses, obtains a projection relationship based on a result of the distinguishing, and performs camera calibration based on the projection relationship, thereby providing a technical effect of improving accuracy of the calibration.

The disclosure provides an electronic device 100 for performing camera calibration. According to an embodiment of the disclosure, the electronic device 100 may include a communication interface 110, memory 130 storing one or more computer programs, and one or more processors 120 communicatively coupled to the communication interface and the memory, wherein the one or more computer programs include computer-executable instructions that, when executed by the one or more processors individually or collectively, cause the electronic device to obtain, via the communication interface 110, a first image of a user captured by a first camera, and a second image of the user captured by a second camera, extract first joint feature points, which are 2D position coordinate values of joints of the user, from the first image, and second joint feature points, which are 2D position coordinate values of the joints, from the second image, obtain 3D joint feature points of the joints by lifting the extracted first joint feature points to 3D position coordinate values, obtain a projection relationship for projecting the 3D joint feature points onto the 2D position coordinate values of the second joint feature points, and to perform camera calibration by predicting a positional relationship between the first camera and the second camera based on the obtained projection relationship.

In an embodiment of the disclosure, the one or more computer programs further include computer-executable instructions that, when executed by the one or more processors 120 individually or collectively, cause the electronic device to obtain information about a rotation direction and a movement distance value for projecting the 3D joint feature points to match the 2D position coordinate values of the second joint feature points.

In an embodiment of the disclosure, the one or more computer programs further include computer-executable instructions that, when executed by the one or more processors 120 individually or collectively, cause the electronic device to determine whether a 3D pose of the user consisting of the 3D joint feature points are suitable to apply to the camera calibration, based on a distribution of coordinate values in a z-axis direction among the 3D position coordinate values included in the 3D joint feature points.

In an embodiment of the disclosure, the electronic device 100 may further include a display, and the one or more computer programs further include computer-executable instructions that, when executed by the one or more processors 120 individually or collectively, cause the electronic device to, in a case that it is determined that the pose of the user is not suitable for the application to the camera calibration, control the display to display guide information requesting the user to assume a predetermined pose.

In an embodiment of the disclosure, the one or more computer programs further include computer-executable instructions that, when executed by the one or more processors 120 individually or collectively, cause the electronic device to obtain a plurality of image frames captured over a certain period of time from the first camera, obtain a plurality of 3D joint feature points by lifting a plurality of first joint feature points extracted from each of the plurality of image frames, identify, among the plurality of first image frames, an image frame with a largest degree of distribution of coordinate values in the z-axis direction among a plurality of 3D position coordinate values included in the plurality of 3D joint feature points, extract the second joint feature points from the second image corresponding to the identified image frame among the plurality of second image frames, and perform the camera calibration based on a projection relationship between 3D joint coordinate values obtained from the identified image frame and the second joint feature points extracted from the second image.

In an embodiment of the disclosure, the one or more computer programs further include computer-executable instructions that, when executed by the one or more processors 120 individually or collectively, cause the electronic device to obtain 3D position coordinate values of the joints of the user, based on the first joint feature points, the second joint feature points, and the positional relationship between the first camera and the second camera, and estimate a 3D pose of the user based on the obtained 3D position coordinate values of the joints.

In an embodiment of the disclosure, the one or more computer programs further include computer-executable instructions that, when executed by the one or more processors 120 individually or collectively, cause the electronic device to obtain first position coordinate values and second position coordinate values by reprojecting the 3D position coordinate values onto 2D position coordinate values based on information about calibration between the first camera and the second camera, calculate a difference value between the first position coordinate values obtained as a result of the reprojection and the first joint feature points and a difference value between the second position coordinate values and the second joint feature points, compare the calculated difference values with a predetermined threshold, and determine accuracy of the camera calibration based on a result of the comparison.

In an embodiment of the disclosure, the one or more computer programs further include computer-executable instructions that, when executed by the one or more processors 120 individually or collectively, cause the electronic device to measure a bone length between joints from the 3D pose, calculate a difference value by comparing the measured bone length with a bone length of a normal person, and determine whether to re-perform the camera calibration based on a result of comparing the calculated difference value with a predetermined threshold.

In an embodiment of the disclosure, the one or more computer programs further include computer-executable instructions that, when executed by the one or more processors 120 individually or collectively, cause the electronic device to extract, from the first image, a plurality of first joint feature points that are 2D position coordinate values of joints of a plurality of users, and extract, from the second image, a plurality of second joint feature points that are 2D position coordinate values of the joints of the plurality of users, obtain a plurality of first 3D joint feature points and a plurality of second 3D joint feature points by lifting the plurality of first joint feature points and the plurality of second joint feature points to 3D position coordinate values, respectively, and distinguish the plurality of users included in the first image and the second image by matching a first 3D pose consisting of the obtained plurality of first 3D joint feature points with a second 3D pose consisting of the plurality of second 3D joint feature points.

In an embodiment of the disclosure, the one or more computer programs further include computer-executable instructions that, when executed by the one or more processors 120 individually or collectively, cause the electronic device to obtain, based on a result of the distinguishing of the plurality of users, a projection relationship for respectively projecting the plurality of first 3D joint feature points onto the plurality of second joint feature points.

The disclosure provides a method, performed by an electronic device 100, for performing camera calibration. The method may include obtaining, by the electronic device, a first image of a user captured from a first camera 210, and a second image of the user captured from a second camera 220 (S410), extracting, by the electronic device, first joint feature points, which are 2D position coordinate values of joints of the user, from the first image, and second joint feature points, which are 2D position coordinate values of the joints, from the second image (S420), obtaining, by the electronic device, 3D joint feature points of the joints by lifting the extracted first joint feature points to 3D position coordinate values (S430), obtaining, by the electronic device, a projection relationship for projecting the 3D joint feature points onto the 2D position coordinate values of the second joint feature points (S440), and performing, by the electronic device, camera calibration by predicting a positional relationship between the first camera 210 and the second camera 220 based on the obtained projection relationship (S450).

In an embodiment of the disclosure, the obtaining of the projection relationship (S440) may include obtaining information about a rotation direction and a movement distance value for projecting the 3D joint feature points to match the 2D position coordinate values of the second joint feature points.

In an embodiment of the disclosure, the method may further include determining whether a 3D pose of the user consisting of the 3D joint feature points are suitable to apply to the camera calibration, based on a distribution of coordinate values in a z-axis direction among the 3D position coordinate values included in the 3D joint feature points (S510).

In an embodiment of the disclosure, the method may further include displaying guide information requesting the user to assume a predetermined pose in a case that it is determined that the 3D pose of the user is not suitable for the application to the camera calibration (S530).

In an embodiment of the disclosure, the method may further include obtaining 3D position coordinate values of the joints of the user, based on the first joint feature points, the second joint feature points, and the positional relationship between the first camera 210 and the second camera 220, and estimating a 3D pose of the user based on the obtained 3D position coordinate values of the joints.

In an embodiment of the disclosure, the method may further include obtaining first position coordinate values and second position coordinate values by reprojecting the 3D position coordinate values onto 2D position coordinate values based on information about calibration between the first camera and the second camera (S920), calculating a difference value between the first position coordinate values obtained as a result of the reprojection and the first joint feature points and a difference value between the second position coordinate values and the second joint feature points (S930), comparing the calculated difference values with a predetermined threshold (S940), and determining accuracy of the camera calibration based on a result of the comparing.

In an embodiment of the disclosure, the method may further include measuring a bone length between joints from the 3D pose (S1120), calculating a difference value by comparing the measured bone length with a bone length of a normal person (S1130), and determining whether to re-perform the camera calibration based on a result of comparing of the calculated difference value with a predetermined threshold.

In an embodiment of the disclosure, the extracting of the first joint feature points and the second joint feature points (S420) may include extracting, from the first image, a plurality of first joint feature points that are 2D position coordinate values of joints of a plurality of users, and extracting, from the second image, a plurality of second joint feature points that are 2D position coordinate values of the joints of the plurality of users (S1310), obtaining a plurality of first 3D joint feature points and a plurality of second 3D joint feature points by lifting the plurality of first joint feature points and the plurality of second joint feature points to 3D position coordinate values (S1320), respectively, and distinguishing the plurality of users included in the first image and the second image by matching a first 3D pose consisting of the obtained plurality of first 3D joint feature points with a second 3D pose consisting of the plurality of second 3D joint feature points (S1330).

In an embodiment of the disclosure, the obtaining of the projection relationship may include obtaining, based on a result of the distinguishing of the plurality of users, the projection relationship for respectively projecting the plurality of first 3D joint feature points onto the plurality of second joint feature points (S1340).

The disclosure provides one or more non-transitory computer-readable storage media storing one or more computer programs including computer-executable instructions that, when executed by one or more processors of an electronic device individually or collectively, cause the electronic device to perform operations. The operations include obtaining, by the electronic device, a first image of a user captured by a first camera 210 and a second image of the user captured by a second camera 220, extracting, by the electronic device, first joint feature points, which are 2D position coordinate values of joints of the user, from the first image, and second joint feature points, which are 2D position coordinate values of the joints, from the second image, obtaining, by the electronic device, 3D joint feature points of the joints by lifting the extracted first joint feature points to 3D position coordinate values, obtaining, by the electronic device, a projection relationship for projecting the 3D joint feature points onto the 2D position coordinate values of the second joint feature points, and performing, by the electronic device, camera calibration by predicting a positional relationship between the first camera 210 and the second camera 220 based on the obtained projection relationship.

A program executed by the electronic device 100 described in this specification may be implemented as a hardware component, a software component, and/or a combination of the hardware component and the software component. The program may be executed by any system capable of executing computer-readable instructions.

Software may include a computer program, a piece of code, an instruction, or a combination of one or more thereof, and configure a processing device to operate as desired or instruct the processing device independently or collectively.

The software may be implemented as a computer program including instructions stored in computer-readable storage media. Examples of the computer-readable recording media include magnetic storage media (e.g., ROM, RAM, floppy disks, hard disks, etc.), optical recording media (e.g., compact disc (CD)-ROM and a digital versatile disc (DVD)), etc. The computer-readable recording media may be distributed over computer systems connected through a network so that computer-readable code may be stored and executed in a distributed manner. The media may be readable by a computer, stored in memory, and executed by a processor.

A computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium. For example, the 'non-transitory storage medium' may include a buffer in which data is temporarily stored.

Furthermore, programs according to embodiments disclosed in the specification may be included in a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of the electronic device 100 or through an electronic market (e.g., Samsung Galaxy Store™). For such electronic distribution, at least a part of the software program may be stored in the storage medium or may be temporarily generated. In this case, the storage medium may be a storage medium of a server of a manufacturer of the electronic device 100, a server of the electronic market, or a relay server for temporarily storing the software program.

In a system including the electronic device 100 and/or a server, the computer program product may include a storage medium of the server or a storage medium of the electronic device 100. Alternatively, in a case where there is a third device (e.g., a wearable device) communicatively connected to the electronic device 100, the computer program product may include a storage medium of the third device. Alternatively, the computer program product may include a software program itself that is transmitted from the electronic device 100 to the third device or that is transmitted from the third device to the electronic device.

In this case, one of the electronic device 100 and the third device may execute the computer program product to perform methods according to embodiments of the disclosure. Alternatively, at least one of the electronic device 100 or the third device may execute the computer program product to perform the methods according to the embodiments of the disclosure in a distributed manner.

For example, the electronic device 100 may execute the computer program product stored in the memory (130 of FIG. 2) to control another electronic device communicatively connected to the electronic device 100 to perform the methods according to the disclosed embodiments.

In another example, the third device may execute the computer program product to control an electronic device communicatively connected to the third device to perform the methods according to the disclosed embodiments.

In a case where the third device executes the computer program product, the third device may download the computer program product from the electronic device 100 and execute the downloaded computer program product. Alternatively, the third device may execute the computer program product that is pre-loaded therein to perform the methods according to the disclosed embodiments.

For example, adequate effects may be achieved even when the above-described techniques are performed in a different order than that described above, and/or the aforementioned components such as computer systems or modules are coupled or combined in different forms and modes than those described above or are replaced or supplemented by other components or their equivalents.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device for performing camera calibration, the electronic device comprising:

a communication interface;

memory storing one or more computer programs; and one or more processors including processing circuitry and communicatively coupled to the communication interface and the memory, wherein the one or more computer programs include computer-executable instructions that, when executed by the one or more processors individually or collectively, cause the electronic device to:

obtain, via the communication interface, a first image of a user captured by a first camera, and a second image of the user captured by a second camera, extract first joint feature points, which are two-dimensional (2D) position coordinate values of joints of the user, from the first image, and second joint feature points, which are 2D position coordinate values of the joints, from the second image, obtain three-dimensional (3D) joint feature points of the joints by lifting the extracted first joint feature points to 3D position coordinate values, obtain a projection relationship for projecting the 3D joint feature points onto the 2D position coordinate values of the second joint feature points, the projection relationship including information about a rotation direction and a movement distance value for projecting 3D position coordinate values to 2D position coordinate values, and perform camera calibration by predicting a positional relationship between the first camera and the second camera based on the obtained projection relationship.

2. The electronic device of claim 1, wherein the one or more computer programs further include computer-executable instructions that, when executed by the one or more processors individually or collectively, cause the electronic device to determine whether a 3D pose of the user consisting of the 3D joint feature points are suitable to apply to the camera calibration, based on a distribution of coordinate values in a z-axis direction among the 3D position coordinate values included in the 3D joint feature points.

3. The electronic device of claim 2, further comprising a display, wherein the one or more computer programs further include computer-executable instructions that, when executed by the one or more processors individually or collectively, cause the electronic device to, in a case that it is determined that the 3D pose of the user is not suitable to apply to the camera calibration, control the display to display guide information requesting the user to assume a predetermined pose.

4. The electronic device of claim 2, wherein the one or more computer programs further include computer-executable instructions that, when executed by the one or more processors individually or collectively, cause the electronic device to:

obtain a plurality of first image frames captured over a period of time from the first camera and obtain a plurality of second image frames captured over the period of time from the second camera, obtain a plurality of 3D joint feature points by lifting a plurality of first joint feature points extracted from each of the plurality of first image frames, identify, among the plurality of first image frames, an image frame with a largest degree of distribution of coordinate values in the z-axis direction among a plurality of 3D position coordinate values of the plurality of 3D joint feature points, extract the second joint feature points from the second image corresponding to the identified image frame among the plurality of second image frames, and perform the camera calibration based on a projection relationship between 3D joint coordinate values obtained from the identified image frame and the second joint feature points extracted from the second image.

5. The electronic device of claim 1, wherein the one or more computer programs further include computer-executable instructions that, when executed by the one or more processors individually or collectively, cause the electronic device to:

obtain 3D position coordinate values of the joints of the user, based on the first joint feature points, the second joint feature points, and the positional relationship between the first camera and the second camera, and estimate a 3D pose of the user based on the obtained 3D position coordinate values of the joints.

6. The electronic device of claim 5, wherein the one or more computer programs further include computer-executable instructions that, when executed by the one or more processors individually or collectively, cause the electronic device:

obtain first position coordinate values and second position coordinate values by reprojecting the 3D position coordinate values onto 2D position coordinate values based on information about calibration between the first camera and the second camera, calculate a difference value between the first position coordinate values obtained as a result of the reprojection and the first joint feature points and a difference value between the second position coordinate values and the second joint feature points, compare the calculated difference values with a predetermined threshold, and determine accuracy of the camera calibration based on a result of the comparison.

7. The electronic device of claim 5, wherein the one or more computer programs further include computer-executable instructions that, when executed by the one or more processors individually or collectively, cause the electronic device to:

measure a bone length between joints from the 3D pose, calculate a difference value by comparing the measured bone length with a bone length of a normal person, and determine whether to re-perform the camera calibration based on a result of comparing the calculated difference value with a predetermined threshold.

8. The electronic device of claim 1, wherein the one or more computer programs further include computer-executable instructions that, when executed by the one or more processors individually or collectively, cause the electronic device to:

extract, from the first image, a plurality of first joint feature points that are 2D position coordinate values of joints of a plurality of users, and extract, from the second image, a plurality of second joint feature points that are 2D position coordinate values of the joints of the plurality of users, obtain a plurality of first 3D joint feature points and a plurality of second 3D joint feature points by lifting the plurality of first joint feature points and the plurality of second joint feature points to 3D position coordinate values, respectively, and distinguish the plurality of users included in the first image and the second image by matching a first 3D pose consisting of the obtained plurality of first 3D joint feature points with a second 3D pose consisting of the plurality of second 3D joint feature points.

9. A method performed by an electronic device for performing camera calibration, the method comprising:

obtaining, by the electronic device, a first image of a user captured by a first camera, and a second image of the user captured by a second camera;

extracting, by the electronic device, first joint feature points, which are two-dimensional (2D) position coordinate values of joints of the user, from the first image, and second joint feature points, which are 2D position coordinate values of the joints, from the second image;

obtaining, by the electronic device, three-dimensional (3D) joint feature points of the joints by lifting the extracted first joint feature points to 3D position coordinate values;

obtaining, by the electronic device, a projection relationship for projecting the 3D joint feature points onto the 2D position coordinate values of the second joint feature points, the projection relationship including information about a rotation direction and a movement distance value for projecting 3D position coordinate values to 2D position coordinate values; and performing, by the electronic device, camera calibration by predicting a positional relationship between the first camera and the second camera based on the obtained projection relationship.

10. The method of claim 9, further comprising:

determining whether a 3D pose of the user consisting of the 3D joint feature points are suitable to apply to the camera calibration, based on a distribution of coordinate values in a z-axis direction among the 3D position coordinate values included in the 3D joint feature points.

11. The method of claim 10, further comprising:

displaying guide information requesting the user to assume a predetermined pose in a case that it is determined that the 3D pose of the user is not suitable to apply to the camera calibration.

12. The method of claim 10, further comprising:

obtaining a plurality of first image frames captured over a period of time from the first camera and obtain a plurality of second image frames captured over the period of time from the second camera;

obtaining a plurality of 3D joint feature points by lifting a plurality of first joint feature points extracted from each of the plurality of first image frames;

identifying, among the plurality of first image frames, an image frame with a largest degree of distribution of coordinate values in the z-axis direction among a plurality of 3D position coordinate values of the plurality of 3D joint feature points;

extracting the second joint feature points from the second image corresponding to the identified image frame among the plurality of second image frames; and performing the camera calibration based on a projection relationship between 3D joint coordinate values obtained from the identified image frame and the second joint feature points extracted from the second image.

13. The method of claim 9, further comprising:

obtaining 3D position coordinate values of the joints of the user, based on the first joint feature points, the second joint feature points, and the positional relationship between the first camera and the second camera; and estimating a 3D pose of the user based on the obtained 3D position coordinate values of the joints.

14. The method of claim 13, further comprising:

obtaining first position coordinate values and second position coordinate values by reprojecting the 3D position coordinate values onto 2D position coordinate values based on information about the calibration between the first camera and the second camera;

calculating a difference value between the first position coordinate values obtained as a result of the reprojection and the first joint feature points and a difference value between the second position coordinate values and the second joint feature points;

comparing the calculated difference values with a predetermined threshold; and determining accuracy of the camera calibration based on a result of the comparing.

15. The method of claim 13, further comprising:

measuring a bone length between joints from the 3D pose;

calculating a difference value by comparing the measured bone length with a bone length of a normal person; and determining whether to re-perform the camera calibration based on a result of comparing the calculated difference value with a predetermined threshold.

16. The method of claim 9, further comprising:

extracting, from the first image, a plurality of first joint feature points that are 2D position coordinate values of joints of a plurality of users, and extracting, from the second image, a plurality of second joint feature points that are 2D position coordinate values of the joints of the plurality of users;

obtaining a plurality of first 3D joint feature points and a plurality of second 3D joint feature points by lifting the plurality of first joint feature points and the plurality of second joint feature points to 3D position coordinate values, respectively; and distinguishing the plurality of users included in the first image and the second image by matching a first 3D pose consisting of the obtained plurality of first 3D joint feature points with a second 3D pose consisting of the plurality of second 3D joint feature points.

17. One or more non-transitory computer-readable storage media storing one or more computer programs including computer-executable instructions that, when executed by one or more processors of an electronic device individually or collectively, cause the electronic device to perform operations, the operations comprising:

obtaining, by the electronic device, a first image of a user captured by a first camera, and a second image of the user captured by a second camera;

extracting, by the electronic device, first joint feature points, which are two-dimensional (2D) position coordinate values of joints of the user, from the first image, and second joint feature points, which are 2D position coordinate values of the joints, from the second image;

obtaining, by the electronic device, three-dimensional (3D) joint feature points of the joints by lifting the extracted first joint feature points to 3D position coordinate values;

obtaining, by the electronic device, a projection relationship for projecting the 3D joint feature points onto the 2D position coordinate values of the second joint feature points, the projection relationship including information about a rotation direction and a movement distance value for projecting 3D position coordinate values to 2D position coordinate values; and performing, by the electronic device, camera calibration by predicting a positional relationship between the first camera and the second camera based on the obtained projection relationship.

18. The one or more non-transitory computer-readable storage media of claim 17, the operations further comprising:

determining whether a 3D pose of the user consisting of the 3D joint feature points are suitable to apply to the camera calibration, based on a distribution of coordinate values in a z-axis direction among the 3D position coordinate values included in the 3D joint feature points.

19. The electronic device of claim 1, wherein the projection relationship includes information about a rotation direction and a movement distance value for projecting the 3D joint feature points so that the 3D joint feature points match the 2D position coordinate values of the second joint feature points.

* * * * *